US012578665B2

(12) United States Patent
Kakinuma et al.

(10) Patent No.: US 12,578,665 B2
(45) Date of Patent: Mar. 17, 2026

(54) TONER PRODUCING METHOD

(71) Applicants: Hidekazu Kakinuma, Shizuoka (JP); Hiroshi Yamada, Shizuoka (JP)

(72) Inventors: Hidekazu Kakinuma, Shizuoka (JP); Hiroshi Yamada, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 600 days.

(21) Appl. No.: 18/088,788

(22) Filed: Dec. 27, 2022

(65) Prior Publication Data

US 2023/0305413 A1 Sep. 28, 2023

(30) Foreign Application Priority Data

Jan. 25, 2022 (JP) ................................ 2022-009473
Aug. 10, 2022 (JP) ................................ 2022-128079

(51) Int. Cl.

*G03G 9/08* (2006.01)
*G03G 9/087* (2006.01)
*G03G 15/08* (2006.01)

(52) U.S. Cl.

CPC ....... *G03G 9/08755* (2013.01); *G03G 9/0806* (2013.01); *G03G 9/0821* (2013.01); *G03G 9/08782* (2013.01); *G03G 15/0822* (2013.01)

(58) Field of Classification Search

CPC ............. G03G 9/08755; G03G 9/0806; G03G 9/0821; G03G 9/08782; G03G 15/0822
See application file for complete search history.

(56) References Cited

U.S. PATENT DOCUMENTS

2003/0027074 A1 2/2003 Emoto et al.
2003/0096185 A1 5/2003 Yamashita et al.
2003/0134220 A1 7/2003 Emoto et al.
2003/0138717 A1 7/2003 Yagi et al.
2003/0152859 A1 8/2003 Emoto et al.
(Continued)

FOREIGN PATENT DOCUMENTS

JP 08-176310 7/1996
JP 2005-015589 1/2005
(Continued)

OTHER PUBLICATIONS

U.S. Appl. No. 17/811,054, filed Jul. 6, 2022.
U.S. Appl. No. 17/743,449, filed May 13, 2022.

*Primary Examiner* — Mark F. Huff
*Assistant Examiner* — Charles Collins Sullivan, IV
(74) *Attorney, Agent, or Firm* — XSENSUS LLP

(57) ABSTRACT

A toner includes: a crystalline polyester, an amorphous polyester, and a release agent. In measurement through DSC of the toner before a predetermined storage treatment, one or more peaks as an endothermic component are present in a temperature region lower than a peak derived from the crystalline polyester. The toner satisfies expression (1) below.

$$1.5 \leq H1-H2 \leq 4.5 [J/g]$$

In the expression (1), H1 is a total endothermic amount of an endothermic amount of the peak derived from the crystalline polyester and the one or more peaks present in the lower temperature region in the measurement through DSC of the toner before the storage treatment. H2 is an endothermic amount of a peak derived from the crystalline polyester in measurement through DSC of the toner after the storage treatment.

20 Claims, 5 Drawing Sheets

(56) References Cited

U.S. PATENT DOCUMENTS

| | | | | |
|---|---|---|---|---|
| 2003/0180644 | A1 | 9/2003 | Nanya et al. | |
| 2004/0131961 | A1 | 7/2004 | Watanabe et al. | |
| 2004/0157146 | A1 | 8/2004 | Tomita et al. | |
| 2005/0112488 | A1 | 5/2005 | Yamada et al. | |
| 2006/0024097 | A1 | 2/2006 | Yamada et al. | |
| 2006/0063089 | A1* | 3/2006 | Tanaka | G03G 9/0806 430/110.3 |
| 2006/0204883 | A1 | 9/2006 | Nakayama et al. | |
| 2007/0184370 | A1 | 8/2007 | Yamashita et al. | |
| 2008/0090165 | A1 | 4/2008 | Yamada et al. | |
| 2008/0227000 | A1 | 9/2008 | Honda et al. | |
| 2008/0280218 | A1 | 11/2008 | Sabu et al. | |
| 2008/0280219 | A1 | 11/2008 | Nakayama et al. | |
| 2010/0285402 | A1 | 11/2010 | Saitoh et al. | |
| 2011/0033796 | A1 | 2/2011 | Yamada et al. | |
| 2011/0200928 | A1* | 8/2011 | Watanabe | G03G 9/08797 430/105 |
| 2014/0242514 | A1 | 8/2014 | Inoue et al. | |
| 2014/0272695 | A1 | 9/2014 | Moritani et al. | |
| 2014/0342283 | A1 | 11/2014 | Yamamoto et al. | |
| 2017/0010550 | A1 | 1/2017 | Nagata et al. | |
| 2017/0017175 | A1 | 1/2017 | Yamada et al. | |
| 2017/0371257 | A1 | 12/2017 | Santo et al. | |
| 2018/0059561 | A1 | 3/2018 | Nakashima et al. | |
| 2021/0356877 | A1 | 11/2021 | Kamada et al. | |
| 2021/0389686 | A1 | 12/2021 | Kakinuma et al. | |
| 2022/0050395 | A1 | 2/2022 | Yamada et al. | |
| 2022/0057725 | A1 | 2/2022 | Inoue et al. | |
| 2022/0291602 | A1 | 9/2022 | Kamada et al. | |
| 2022/0326632 | A1 | 10/2022 | Makabe et al. | |

FOREIGN PATENT DOCUMENTS

| | | |
|---|---|---|
| JP | 2013-137420 | 7/2013 |
| JP | 2014-160194 | 9/2014 |
| JP | 2018-031989 | 3/2018 |

* cited by examiner

TONER PRODUCING METHOD

CROSS-REFERENCE TO RELATED APPLICATIONS

The present application claims priority under 35 U.S.C. § 119 to Japanese Patent Application No. 2022-009473, filed Jan. 25, 2022 and Japanese Patent Application No. 2022-128079, filed Aug. 10, 2022. The contents of which are incorporated herein by reference in their entirety.

BACKGROUND OF THE INVENTION

1. Field of the Invention

The disclosures herein generally relate to a toner, a developer, a toner-storing unit, an image forming apparatus, an image forming method, and a toner producing method.

2. Description of the Related Art

In recent years, toners have been required to have a small particle diameter for improving the quality of output images, high-temperature offset resistance, low-temperature fixability for energy saving, and heat-resistant storage stability capable of withstanding high-temperature and high-humidity during storage or transportation after production. In particular, since the power consumption at the time of fixing accounts for most of the power consumption in the image forming process, it is very important to improve the low-temperature fixability.

For example, Japanese Unexamined Patent Application Publication No. 2014-160194 proposes a toner that includes a crystalline polyester and a non-crystalline polyester, and proposes that the melting point of the crystalline polyester resin and the endothermic peak temperature derived from the crystalline polyester in DSC measurement are specified for the purpose of achieving both lowtemperature fixability and heat-resistant storage stability and obtaining high image quality even after long-term storage. Japanese Unexamined Patent Application Publication No. 2013-137420 proposes a toner that includes a release agent, a crystalline polyester resin, and a non-crystalline polyester resin, and proposes that an endothermic peak temperature derived from the release agent and an endothermic peak temperature derived from the crystalline polyester are specified when the toner is measured through DSC. In addition, Japanese Unexamined Patent Application Publication No. 2018-31989 proposes a toner that includes an amorphous resin and a crystalline resin, and proposes that an onset temperature of an endothermic peak of the toner is specified when the toner is subjected to predetermined storage and DSC measurement before and after storage, for the purpose of minimizing the occurrence of offset and image omission.

However, in order to improve the low-temperature fixability, use of a crystalline polyester or a resin having a low glass transition temperature has been considered, but it is necessary to achieve a balance so as not to deteriorate the storage stability that is a trade-off of the low-temperature fixability, and it has become difficult to further improve the low-temperature fixability. In order to further improve the low-temperature fixability, it is considered necessary to take measures with respect to the crystalline polyester.

For example, Japanese Unexamined Patent Application Publication No. H8-176310 proposes use of a process to obtain crystalline polyester spherical particle powder having an independent spherical crystalline shape. In the above process, a crystalline polyester is dissolved in a solvent for phase separation by heating, and the solution is cooled to induce phase separation to form a heterogeneous solution in which the crystalline polyester is phase-separated as independent spherical crystalline particles. Then, the crystalline polyester particles are precipitated and separated in the phase-separated state. Japanese Unexamined Patent Application Publication No. 2005-15589 proposes a method of producing a crystalline polyester resin dispersion liquid by heating a crystalline polyester resin in an organic solvent to form a solution, precipitating the crystalline polyester resin to form a crude dispersion liquid, and pulverizing the crude dispersion liquid.

SUMMARY OF THE INVENTION

In one embodiment, a toner includes a binder resin and a release agent. The binder resin includes a crystalline polyester and an amorphous polyester. In a measurement result of a first temperature rise obtained by measurement through differential scanning calorimetry (DSC) of the toner before undergoing a storage treatment below, one or more peaks as an endothermic component are present in a temperature region lower than a peak derived from the crystalline polyester. The toner satisfies expression (1) below.

[Storage Treatment]

Where a glass transition temperature of the toner is defined as Tg [° C.] and Tg−5° C. is defined as Ta [° C.], the toner is stored at Ta [° C.] and humidity of 50% RH for 24 hours, provided that the glass transition temperature Tg of the toner corresponds to a glass transition temperature of the toner before undergoing the storage treatment.

[expression (1)]

$$1.5 \leq H1-H2 \leq 4.5\,[\mathrm{J/g}] \qquad \text{expression (1)}$$

In the expression (1), H1 is a total endothermic amount of an endothermic amount of the peak derived from the crystalline polyester and an endothermic amount of the one or more peaks present in the temperature region lower than the peak derived from the crystalline polyester in the measurement result of the first temperature rise obtained by measurement through DSC of the toner before undergoing the storage treatment. H2 is a total endothermic amount of an endothermic amount of a peak derived from the crystalline polyester and an endothermic amount of a peak present in a temperature region lower than the peak derived from the crystalline polyester in a measurement result of a first temperature rise obtained by measurement through the DSC of the toner after undergoing the storage treatment, provided that when the endothermic amount of the peak present in the temperature region lower than the peak derived from the crystalline polyester is zero, the H2 is the endothermic amount of the peak derived from the crystalline polyester.

DESCRIPTION OF THE PREFERRED EMBODIMENTS

Figure 1:
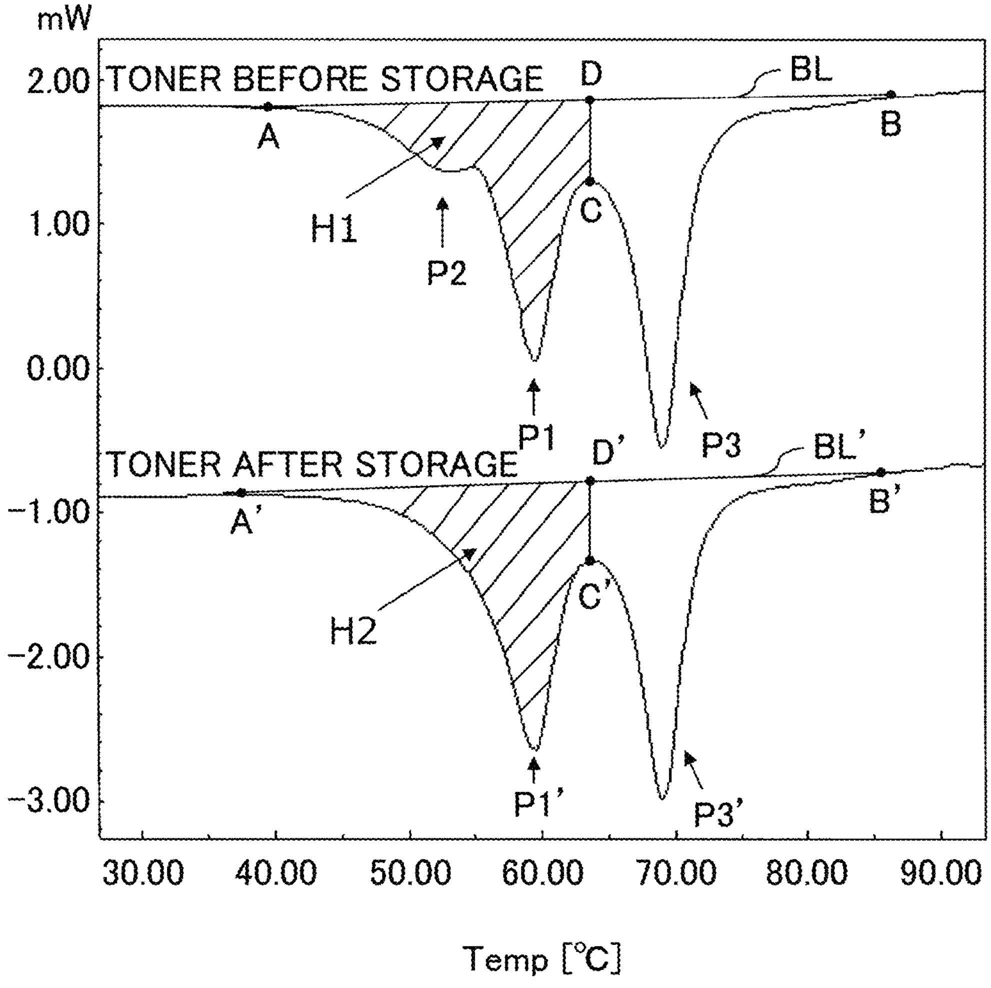
FIG. 1 is a view illustrating an example of the results of DSC measurement.

In the following, embodiments of the present invention will be described with reference to the accompanying drawings.

In the techniques described in Japanese Unexamined Patent Application Publication Nos. 2014-160194, 2013-137420, 2018-31989, H8-176310, and 2005-15589, it is considered that low-temperature fixing can be achieved because the crystalline polyester resin melts more rapidly than the amorphous polyester resin. However, even when the crystalline polyester resin corresponding to islands of the sea-island phase separation structure melts, the amorphous polyester resin corresponding to most of the sea does not melt. That is, the toner is not sufficiently fixed unless both the crystalline polyester resin and the amorphous polyester resin are melted to some extent. In order to further improve the low-temperature fixability, it is necessary to increase the blending rate of the crystalline polyester resin. However, the crystalline polyester resin exposed on the surface of the toner is likely to cause filming, and may be a factor that reduces the toner chargeability.

Therefore, since the speed of machines has increased in recent years, it is desired that toners satisfy the requirements for high durability and further energy saving, yet it is difficult to sufficiently satisfy these requirements at present. Moreover, further improvement and development are desired.

Therefore, an object of the present disclosure is to provide a toner that is excellent in low-temperature fixability and storage stability, has good offset resistance, and can form an image with high quality and good sharpness over a long period of time.

According to the present disclosure, it is possible to provide a toner, which is excellent in low-temperature fixability and storage stability, has good offset resistance, and can form an image with high quality and good sharpness over a long period of time.

Hereinafter, a toner, a developer, a toner-storing unit, an image forming apparatus, an image forming method, and a method of producing a toner according to the present disclosure will be described with reference to the drawings. It should be noted that the present disclosure is not limited to the embodiments described below, and changes such as other embodiments, additions, modifications, and deletions can be made within the scope conceivable by persons skilled in the art. Any aspect shall be included in the scope of the present disclosure as long as the actions and effects of the present disclosure are exhibited.

(Toner)

A toner of the present disclosure includes a binder resin and a release agent.

The binder resin includes a crystalline polyester and an amorphous polyester.

In a measurement result of a first temperature rise obtained by measurement through differential scanning calorimetry (DSC) of the toner before undergoing a storage treatment below, one or more peaks as an endothermic component are present in a temperature region lower than a peak derived from the crystalline polyester.

The toner satisfies expression (1) below.

[Storage Treatment]

Where a glass transition temperature of the toner is defined as Tg [° C.] and Tg−5° C. is defined as Ta [° C.], the toner is stored at Ta [° C.] and humidity of 50% RH for 24 hours, provided that the glass transition temperature Tg of the toner corresponds to a glass transition temperature of the toner before undergoing the storage treatment.

[expression (1)]

$$1.5 \leq H1 - H2 \leq 4.5\,[\mathrm{J/g}] \qquad \text{expression (1)}$$

In the expression (1), H1 is a total endothermic amount of an endothermic amount of the peak derived from the crystalline polyester and an endothermic amount of the one or more peaks present in the temperature region lower than the peak derived from the crystalline polyester in the measurement result of the first temperature rise obtained by measurement through DSC of the toner before undergoing the storage treatment.

H2 is a total endothermic amount of an endothermic amount of a peak derived from the crystalline polyester and an endothermic amount of a peak present in a temperature region lower than the peak derived from the crystalline polyester in a measurement result of a first temperature rise obtained by measurement through the DSC of the toner after undergoing the storage treatment, provided that when the endothermic amount of the peak present in the temperature region lower than the peak derived from the crystalline polyester is zero, the H2 is the endothermic amount of the peak derived from the crystalline polyester.

Since the crystalline polyester resin in the toner of the present disclosure has crystallinity, the crystalline polyester resin exhibits thermal melting characteristics exhibiting a rapid decrease in viscosity around an endothermic peak temperature. That is, a toner having both good heat-resistant storage stability and low-temperature fixability can be designed because the toner has good heat-resistant storage stability due to crystallinity until just before a temperature at which the melting starts, and causes a rapid decrease in viscosity (sharp melting property) at the temperature at which the melting starts, and fixing of the toner takes place.

The toner of the present disclosure has an endothermic region having a peak top in a temperature region lower than the peak derived from the crystalline polyester in the first temperature rise in DSC measurement (differential scanning calorimetry) in order to further improve low-temperature fixability compared to the traditional toners. The endothermic region is formed when the crystalline polyester and the amorphous polyester are miscible with each other, and results in achievement of low-temperature fixability. This miscible state needs to be partial. When the crystalline polyester and the amorphous polyester are completely miscible with each other, the glass transition temperature Tg of the toner is significantly lowered, and consequently the storage stability cannot be ensured. In addition, the sharp melt property of the crystalline polyester is lost.

The partial miscibility between the crystalline polyester and the amorphous polyester can be controlled by a heat treatment during the production of the toner. The heat treatment varies in accordance with the kind of crystalline polyester, the kind of amorphous polyester, and the blending ratio thereof, and can be adjusted by the heating temperature and heating time.

In addition, it is possible to determine whether or not the crystalline polyester and the amorphous polyester are partially miscible with each other by measuring, through the DSC, the toner after undergoing the predetermined storage treatment and confirming a peak present in a temperature region lower than the peak derived from the crystalline polyester in the first temperature rise.

The storage treatment is as follows.

[Storage Treatment]

Where a glass transition temperature of the toner is defined as Tg [° C.] and Tg−5° C. is defined as Ta [° C.], the toner is stored at Ta [° C.] and humidity of 50% RH for 24 hours.

Note that, that the glass transition temperature Tg of the toner corresponds to a glass transition temperature of the toner before undergoing the storage treatment. The reason why the glass transition temperature Tg of the toner −5° C. is used is because the Tg−5° C. achieves an optimum temperature at which crystallization of the crystalline polyester contained in the toner can be facilitated.

In the case where the crystalline polyester and the amorphous polyester are partially miscible with each other, when the toner after undergoing the storage treatment is measured through DSC, a peak present in a temperature region lower than a peak derived from the crystalline polyester in a first temperature rise in the DSC measurement disappears. The reason for this is because the crystalline polyester miscible with the amorphous polyester is annealed and recrystallized by storing the toner at the temperature Ta and 50% RH for 24 hours.

When the toner after undergoing the storage treatment is measured through DSC, the disappearance of the peak present as an endothermic component in the temperature region lower than the peak derived from the crystalline polyester means that the following expression (1) is satisfied.

$$1.5 \leq H1-H2 \leq 4.5 [J/g] \quad \text{expression (1)}$$

where, in the expression (1), H1 is a total endothermic amount of an endothermic amount of the peak derived from the crystalline polyester and an endothermic amount of the one or more peaks present in the temperature region lower than the peak derived from the crystalline polyester in the measurement result of the first temperature rise obtained by measurement through DSC of the toner before undergoing the storage treatment, and H2 is a total endothermic amount of an endothermic amount of a peak derived from the crystalline polyester and an endothermic amount of a peak present in a temperature region lower than the peak derived from the crystalline polyester in a measurement result of a first temperature rise obtained by measurement through the DSC of the toner after undergoing the storage treatment, provided that when the endothermic amount of the peak present in the temperature region lower than the peak derived from the crystalline polyester is zero, the H2 is the endothermic amount of the peak derived from the crystalline polyester.

When H1-H2 is 1.5 J/g or more and 4.5 J/g or less, partial miscibility between the crystalline polyester and the amorphous polyester is sufficient, and the low-temperature fixability can be exhibited. When H1-H2 is 1.5 J/g or more, it is possible to solve such a problem where the low-temperature fixability cannot be exhibited due to insufficient partial miscibility between the crystalline polyester and the amorphous polyester. In addition, when H1-H2 is 4.5 J/g or less, it is possible to solve such a problem where the storage stability is deteriorated due to excessive partial miscibility.

In addition, the toner preferably satisfies the following expression (2). In this case, low-temperature fixability and offset resistance can be improved.

$$2.5 \leq H1-H2 \leq 4.5 [J/g] \quad \text{expression (2)}$$

When the toner of the present disclosure is subjected to the storage treatment (storage at the temperature Ta and 50% RH for 24 hours), the partially miscible crystalline polyester recrystallizes, and the glass transition temperature increases. In consideration of this point, the following expression (3) is preferably satisfied.

$$5.0 \leq Tg2-Tg1 \leq 10.0 [° C.] \quad \text{expression (3)}$$

In the expression (3), Tg1 is a glass transition temperature determined by measuring, through the DSC, the toner before undergoing the storage treatment, and Tg2 is a glass transition temperature determined by measuring, through the DSC, the toner after undergoing the storage treatment.

When Tg2−Tg1 is 5.0° C. or more and 10.0° C. or less, the partial miscibility between the crystalline polyester and the amorphous polyester can be an appropriate amount, and the low-temperature fixability and the storage stability can be improved. When Tg2−Tg1 is 5.0° C. or more, it is possible to solve such a problem where good low-temperature fixability cannot be obtained due to insufficient partial miscibility. In addition, when Tg2−Tg1 is 10.0° C. or less, it is possible to solve such a problem where storage stability is deteriorated due to excessive partial miscibility.

The glass transition temperature Tg of the toner in the storage treatment corresponds to the Tg1 described above.

In order to obtain the toner of the present disclosure, the miscible state of the crystalline polyester and the amorphous polyester is controlled. Unlike before, the present invention can achieve excellent low-temperature fixability without setting the glass transition temperature of the amorphous resin to be low or increasing the ratio of the crystalline resin. According to the present disclosure, it is possible to form a high-quality image having excellent low-temperature fixability and storage stability, good offset resistance, and good sharpness over a long period of time without performing traditional operations.

In the present disclosure, the glass transition temperature Tg and the endothermic amount of the toner can be measured using, for example, a DSC system (differential scanning calorimeter) ("Q-200" manufactured by TA Instruments).

Specifically, the Tg and the endothermic amount are measured by the following procedure.

First, a target sample (about 5.0 mg) is placed in an aluminum sample vessel, and the sample vessel is placed on a holder unit and is set in an electric oven. Next, the mixture is heated from −80° C. to 150° C. at a heating rate of 10° C./min in a nitrogen atmosphere, and a differential scanning calorimeter ("Q-200", manufactured by TA Instruments) is used to measure a DSC curve. The TG of the target sample can be determined by selecting a DSC curve from among the obtained DSC curves using the analysis program in the Q-200 system. In addition, from the obtained DSC curves, the analysis program in the Q-200 system can be used to determine the endothermic amount of the crystalline polyester resin and the endothermic amount obtained when the crystalline polyester resin and the amorphous polyester resin are partially miscible with each other.

A method of analyzing the endothermic amount will be described with reference to FIG. 1.

First, a method of determining H1 will be described. The upper part of FIG. 1 presents an example of a measurement result of a first temperature rise obtained by measurement through DSC of the toner before undergoing the storage treatment. P1 is a peak derived from a crystalline polyester, P2 is a peak as an endothermic component present in a temperature region lower than the peak derived from the crystalline polyester, and P3 is a peak derived from a release agent. In the illustrated example, the P2 is one peak, but the P2 may be a plurality of peaks.

As can be seen from FIG. 1, in the measurement result of the first temperature rise obtained by measurement through DSC of the toner before undergoing the storage treatment, one or more peaks P2 as an endothermic component are present in the temperature region lower than the peak P1 derived from the crystalline polyester.

As illustrated in the figure, a baseline BL is drawn on the obtained DSC curve. The baseline can be obtained by a general method, and for example, the baseline can be obtained by an analysis program. In the illustrated example, one end portion of the base line BL is set as a point A, and the other end portion is set as a point B. The point A may be, for example, a point where the amount of an increase in the falling of the DSC curve exceeds a predetermined value. The point B can be, for example, a point where the amount of an increase in the DSC curve reaches a value smaller than a predetermined value.

The peak(s) P2 as an endothermic component present in the temperature region lower than the peak derived from the crystalline polyester is/are a peak that is present in a temperature range from the point A to the peak top of the peak P1 derived from the crystalline polyester.

Next, a point C, which is a boundary between the peak P1 derived from the crystalline polyester and the peak P3 derived from the release agent, is determined. The point C may be, for example, a point where the DSC curve goes down from the peak top of the peak P1 derived from the crystalline polyester toward a high temperature side and is closest to the base line. Alternatively, the point C may be a point where the slope of the DSC curve reaches zero.

Then, a straight line is drawn from the point C to the baseline. The intersection of this straight line and the base line is designated as a point D. The straight line CD is a straight line orthogonal to the horizontal line.

A portion surrounded by the straight line AD, the straight line CD, and the DSC curve from the point A to the point C, that is, a hatched portion illustrated in the figure is H1. That is, the hatched portion in the upper part of FIG. 1 corresponds to a total endothermic amount (H1) of the endothermic amount of the peak derived from the crystalline polyester and the endothermic amount of the peak in the temperature region lower than the peak derived from the crystalline polyester in the measurement result of the first temperature rise obtained by measurement through DSC of the toner before undergoing the storage treatment.

Next, a method of determining H2 will be described. The lower part of FIG. 1 presents an example of a measurement result of a first temperature rise obtained by measurement through DSC of the toner of the present disclosure after undergoing the storage treatment. P1' is a peak derived from the crystalline polyester, and P3' is a peak derived from the release agent. As illustrated in the figure, the peak P2 as an endothermic component in the temperature region lower than the peak P1 derived from the crystalline polyester, which has been present in the DSC measurement before the storage treatment, disappears. Alternatively, the peak P2 is so small that it is not noticeable. The disappearance of the peak P2 can be defined as a numerical value by determining H1-H2.

The H2 can be determined in the same manner as the H1 described above, but will be partially described below. Regarding the DSC curve in the lower part of FIG. 1, a base line BL' is first drawn by a general method in the same manner as in the upper part of FIG. 1. In the illustrated example, one end portion of the base line BL' is set as a point A', and the other end portion is set as a point B'. Next, a point C', which is a boundary between the peak P1' derived from the crystalline polyester and the peak P3' derived from the release agent, is determined. Next, a straight line C'D' is drawn from the point C' to the baseline. Then, a portion surrounded by the straight line A'D', the straight line C'D', and the DSC curve from the point A' to the point C', that is, a hatched portion illustrated in the figure is H2.

From the thus-obtained H1 and H2, H1−H2 is determined. When H1−H2 is 1.5 J/g or more and 4.5 J/g or less as in the above expression (1), the peak P2 as an endothermic component in the temperature region lower than the peak P1 derived from the crystalline polyester, which has been present in the DSC measurement before the storage treatment, can be regarded as having disappeared in a measurement result of a first temperature rise obtained by measurement through the DSC of the toner after undergoing the storage treatment.

When the endothermic amount of the peak P2' in the temperature region lower than the peak P1' derived from the crystalline polyester is not zero (when the peak P2' is present) in a measurement result of a first temperature rise obtained by measurement through the DSC of the toner after undergoing the storage treatment, the H2 is the total endothermic amount of the endothermic amount of the peak derived from the crystalline polyester and the endothermic amount of the peak in the temperature region lower than the peak derived from the crystalline polyester. When the endothermic amount of the peak P2' in the temperature region lower than the peak P1' derived from the crystalline polyester is zero, H2 is the endothermic amount of the peak P1' derived from the crystalline polyester.

<Materials of Toner>

Next, materials of the toner in the present embodiments will be described.

<<Binder Resin>>

The binder resin contained in the toner base particles constituting the toner of the present disclosure is not particularly limited and may be appropriately selected from traditional binder resins in accordance with the intended purpose. Examples thereof include polyesters, silicone resins, styrene-acrylic resins, styrene resins, acrylic resins, epoxy resins, diene-based resins, phenol resins, terpene resins, coumarin resins, amide-imide resins, butyral resins, urethane resins, and ethylene-vinyl acetate resins. These can be used alone or as a mixture of two or more kinds thereof.

Among them, as a resin component (resin phase) that is a toner material for producing a toner, polyester (polyester resin) having sufficient flexibility even when the molecular weight is reduced is preferable from the viewpoint of being sharply melted at the time of fixing and being capable of smoothing the surface of an image. Such a polyester may be used in combination with other resins.

As the polyester, for example, a urea-modified polyester is more preferable, and a combination of a urea-modified polyester and an unmodified polyester, or a combination of a urea-modified polyester, an unmodified polyester, and a crystalline polyester is also preferable.

Unmodified Polyester-

As the binder resin, what is known as an unmodified polyester (unmodified polyester) containing no bonding unit other than an ester bond can be used. The binder resin can be obtained by combining such an unmodified polyester with a binder resin precursor having the ester bond and a modified polyester containing an ester bond and a bond unit other than the ester bond, or by combining such an unmodified polyester with a resin precursor capable of forming the modified polyester and a crystalline polyester.

The polyester that can be preferably used in the present disclosure is polyester obtained by reacting one or more kinds of polyols represented by the following formula (1) with one or more kinds of polycarboxylic acids represented by the following formula (2).

$$A\text{-}(OH)m \qquad \text{formula (1)}$$

[In formula (1), A represents an alkyl group having 1 to 20 carbon atoms, an alkylene group having 1 to 20 carbon atoms, an aromatic group that may have a substituent, or a heterocyclic aromatic group that may have a substituent. m represents an integer of 2 to 4.]

$$B\text{—}(COOH)n \qquad \text{formula (2)}$$

[In formula (2), B represents an alkyl group having 1 to 20 carbon atoms, an alkylene group, an aromatic group that may have a substituent, or a heterocyclic aromatic group. n represents an integer of 2 to 4.]

Specific examples of the polyol represented by the formula (1) include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1, 2, 3, 6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, bisphenol A, bisphenol A ethylene oxide adduct, bisphenol A propylene oxide adduct, hydrogenated bisphenol A, hydrogenated bisphenol A ethylene oxide adduct, and hydrogenated bisphenol A propylene oxide adduct.

Specific examples of the polycarboxylic acid represented by the formula (2) include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isooctylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, empol trimer acid, cyclohexanedicarboxylic acid, cyclohexenedicarboxylic acid, butanetetracarboxylic acid, diphenylsulfonetetracarboxylic acid, and ethylene glycol bis(trimellitic acid).

-Amorphous Polyester-

The toner of the present disclosure contains an amorphous polyester (may also be referred to as a non-crystalline polyester). In the present disclosure, a non-crystalline unmodified polyester is preferably used as the binder resin component. A modified polyester obtained by crosslinking and/or elongation reaction of a binder resin precursor composed of a modified polyester-based resin, and an unmodified polyester are preferably at least partially miscible with each other. This makes it possible to improve low-temperature fixability and hot offset resistance. Therefore, a polyol of a modified polyester and an unmodified polyester, and polycarboxylic acid preferably have similar compositions. As the unmodified polyester, a non-crystalline polyester used in a crystalline polyester dispersion liquid can also be used as long as it is unmodified.

The amorphous polyester preferably has a urethane bond and/or a urea bond as described below. In this case, the urethane bond or the urea bond behaves like a pseudo-crosslinking point, and the toner viscoelasticity is improved, so that the toner is excellent in heat-resistant storage stability and high-temperature offset resistance.

Usually, the acid value of the unmodified polyester is preferably 1 KOH mg/g to 50 KOH mg/g, and more preferably 5 KOH mg/g to 30 KOH mg/g. When the acid value of the unmodified polyester is 1 KOH mg/g or more, the toner tends to be negatively charged, and moreover the affinity between paper and the toner is improved at the time of fixing to paper, so that the low-temperature fixability can be improved. When oxidation of the unmodified polyester is 50 KOH mg/g or less, it is possible to solve such a problem where charging stability, particularly charging stability against environmental changes, is lowered.

The hydroxyl value of the unmodified polyester is preferably 5 KOH mg/g or more.

The hydroxyl value is measured using a method in accordance with JIS K0070-1966. First, a sample (0.5 g) is precisely weighed into a 100 ml volumetric flask, and an acetylating agent (5 ml) is added thereto. Next, after the mixture is heated in a warm bath at 100±5° C. for 1 to 2 hours, the flask is taken out from the warm bath and is allowed to cool. Further, water is added and shaken to decompose acetic anhydride. Next, in order to completely decompose acetic anhydride, the flask is again heated in a warm bath for 10 minutes or more and is allowed to cool, and then the wall of the flask is thoroughly washed with an organic solvent.

Further, the hydroxyl value is measured at 23° C. using a potential difference automatic titrator DL-53 Titrator (manufactured by Mettler-Toledo International Inc.) and electrodes DG113-SC (manufactured by Mettler-Toledo International Inc.), and is analyzed using analysis software LabX Light Version 1.00.000. A mixture solvent of toluene (120 ml) and ethanol (30 ml) is used for calibration of the apparatus.

At this time, the measurement conditions are as follows, for example.

Stir
peed [%] 25
Time [s] 15
EQP titration
Titrant/Sensor
Titrant $CH_3Ona$
Concentration [mol/L] 0.1
Sensor DG115
Unit of measurement mV
Predispensing to volume
Volume [mL] 1.0
Wait time [s] 0
Titrant addition Dynamic
dE (set) [mV] 8.0
dV (min) [mL] 0.03
dV (max) [mL] 0.5
Measure mode Equilibrium controlled
dE [mV] 0.5
dt [s] 1.0
t (min) [s] 2.0
t (max) [s] 20.0
Recognition
Threshold 100.0
Steepest jump only No Range No
Tendency None
Termination
at maximum volume [mL] 10.0
at potential No
at slope No
after number EQPs Yes
n=1
comb. termination conditions No
Evaluation
Procedure Standard
Potential 1 No
Potential 2 No
Stop for reevaluation No -Modified Polyester- The modified polyester contains at least an ester bond and a bonding unit other than the ester bond in the molecular structure. Such a modified polyester can be obtained by a reaction of a resin precursor capable of producing what is known as a modified polyester, which includes a compound having an active hydrogen group (active hydrogen group-containing compound) and a polymer (e.g., polyester) having a functional group capable of reacting with the active hydrogen group of the compound.

--Polymer Capable of Reacting with Active Hydrogen Group-Containing Compound--

The polymer capable of reacting with the active hydrogen group-containing compound (hereinafter referred to as "prepolymer") is not particularly limited as long as it has at least a site capable of reacting with an active hydrogen group-containing compound, and can be appropriately selected from traditional resins. For example, a polyol resin, a polyacrylic resin, polyester, an epoxy resin, or a derivative resin thereof can be used. Among them, polyester is preferable in terms of high flowability at the time of melting and transparency. These may be used alone or in combination.

The site capable of reacting with the active hydrogen group-containing compound in the prepolymer is not particularly limited and may be appropriately selected from traditional substituents. Examples thereof include an isocyanate group, an epoxy group, a carboxyl group, and an acid chloride group. These may be contained alone or in combination. Among them, an isocyanate group is preferable.

Among the prepolymers, a urea-bond-forming-group-containing polyester (RMPE) is preferable because the molecular weight of the polymer component can be easily adjusted, and oil-less low-temperature fixing characteristics in a dry toner, in particular, good releasability and fixability can be ensured even in the absence of a release oil application mechanism to a heating medium for fixing.

Examples of the urea bond-forming group include an isocyanate group. When the urea-bond forming group in the urea-bond-forming-group-containing polyester (RMPE) is the isocyanate group, the urea-bond-forming-group-containing polyester (RMPE) is suitably an isocyanate group-containing polyester prepolymer (A) or the like.

The isocyanate group-containing polyester prepolymer (A) is not particularly limited and may be appropriately selected in accordance with the intended purpose. Examples thereof include polycondensates of polyol (PO) and polycarboxylic acid (PC) and those obtained by reacting an active hydrogen group-containing polyester with polyisocyanate (PIC).

The polyol (PO) is not particularly limited and may be appropriately selected in accordance with the intended purpose. Examples thereof include a diol (DIO), a trivalent or higher polyol (TO), and a mixture of a diol (DIO) and a trivalent or higher polyol (TO). These may be used alone or in combination. Among them, a diol (DIO) alone or a mixture of a diol (DIO) and a small amount of a trivalent or higher polyol (TO) is preferable.

Examples of the diol (DIO) include alkylene glycol, alkylene ether glycol, alicyclic diol, alkylene oxide adducts of alicyclic diol, bisphenols, and alkylene oxide adducts of bisphenols.

As the alkylene glycol, those having 2 to 12 carbon atoms are preferable. Examples thereof include ethylene glycol, 1,2-propylene glycol, 1,3-propylene glycol, 1,4-butanediol, and 1,6-hexanediol.

Examples of the alkylene ether glycol include diethylene glycol, triethylene glycol, dipropylene glycol, polyethylene glycol, polypropylene glycol, and polytetramethylene ether glycol.

Examples of the alicyclic diol include 1,4-cyclohexanedimethanol and hydrogenated bisphenol A.

Examples of the alkylene oxide adduct of alicyclic diol include those obtained by adding, to an alicyclic diol, an alkylene oxide such as ethylene oxide, propylene oxide, or butylene oxide.

Examples of the bisphenols include bisphenol A, bisphenol F, and bisphenol S.

Examples of the alkylene oxide adducts of bisphenols include those obtained by adding, to bisphenols, an alkylene oxide such as ethylene oxide, propylene oxide, or butylene oxide. Among them, for example, alkylene glycols having 2 to 12 carbon atoms, alkylene oxide adducts of bisphenols are preferable, and alkylene oxide adducts of bisphenols, and mixtures of alkylene oxide adducts of bisphenols and alkylene glycols having 2 to 12 carbon atoms are preferable.

As the trivalent or higher polyol (TO), trivalent to octavalent polyols or nonavalent or higher polyols are preferable. Examples thereof include polyhydric aliphatic alcohols having 3 or more valences, trivalent or higher polyphenols, and alkylene oxide adducts of trivalent or higher polyphenols.

Examples of the polyhydric aliphatic alcohol having 3 or more valences include glycerin, trimethylolethane, trimethylolpropane, pentaerythritol, and sorbitol.

Examples of trivalent or higher polyphenols include trisphenols (e.g., trisphenol PA manufactured by Honshu Chemical Industry Co., Ltd.), phenolnovolacs, and cresol novolacs.

Examples of the alkylene oxide adducts of trivalent or higher polyphenols include those obtained by adding, to trivalent or higher polyphenols, alkylene oxide such as ethylene oxide, propylene oxide, or butylene oxide.

The mixing mass ratio (DIO:TO) between the diol (DIO) and the trivalent or higher polyol (TO) in the mixture of the diol (DIO) and the trivalent or higher polyol (TO) is preferably 100:0.01 to 100:10, and more preferably 100:0.01 to 100:1.

The polycarboxylic acid (PC) is not particularly limited and may be appropriately selected in accordance with the intended purpose. Examples thereof include dicarboxylic acid (DIC), trivalent or higher polycarboxylic acid (TC), and a mixture of dicarboxylic acid (DIC) and trivalent or higher polycarboxylic acid. These may be used alone or in combination. Among them, dicarboxylic acid (DIC) alone, or a mixture of dicarboxylic acid (DIC) and a small amount of trivalent or higher polycarboxylic acid (TC) is preferable.

Examples of the dicarboxylic acid (DIC) include alkylene dicarboxylic acid, alkenylene dicarboxylic acid, and aromatic dicarboxylic acid.

Examples of the alkylene dicarboxylic acid include succinic acid, adipic acid, and sebacic acid. The alkenylene dicarboxylic acid is preferably alkenylene dicarboxylic acids having 4 to 20 carbon atoms. Examples thereof include maleic acid and fumaric acid. The aromatic dicarboxylic acid is preferably aromatic dicarboxylic acids having 8 to 20 carbon atoms. Examples thereof include phthalic acid, isophthalic acid, terephthalic acid, and naphthalene dicarboxylic acid. Among them, alkenylene dicarboxylic acids having 4 to 20 carbon atoms and aromatic dicarboxylic acids having 8 to 20 carbon atoms are preferable.

As the trivalent or higher polycarboxylic acid (TC), trivalent to octavalent polycarboxylic acids or nonavalent or higher polycarboxylic acids are preferable. Examples thereof include aromatic polycarboxylic acids. The aromatic polycarboxylic acid is preferably aromatic polycarboxylic acids having 9 to 20 carbon atoms. Examples thereof include trimellitic acid and pyromellitic acid.

As the polycarboxylic acid (PC), an acid anhydride or a lower alkyl ester of any one selected from dicarboxylic acid (DIC), trivalent or higher polycarboxylic acid (TC), and a mixture of dicarboxylic acid (DIC) and trivalent or higher polycarboxylic acid may be used. Examples of the lower alkyl ester include methyl ester, ethyl ester, and isopropyl ester.

A mixing mass ratio (DIC: TC) between the dicarboxylic acid (DIC) and the trivalent or higher polycarboxylic acid (TC) in the mixture of the dicarboxylic acid (DIC) and the trivalent or higher polycarboxylic acid (TC) is not particularly limited and may be appropriately selected in accordance with the intended purpose. For example, the mixing mass ratio is preferably 100:0.01 to 100:10, and more preferably 100:0.01 to 100:1.

A mixing ratio when the polyol (PO) and the polycarboxylic acid (PC) are subjected to a polycondensation reaction is not particularly limited and may be appropriately selected in accordance with the intended purpose. For example, usually, the equivalent ratio ([OH]/[COOH]) of the hydroxyl group [OH] in the polyol (PO) to the carboxyl group [COOH] in the polycarboxylic acid (PC) is preferably 2/1 to 1/1, more preferably 1.5/1 to 1/1, and particularly preferably 1.3/1 to 1.02/1.

The amount of the polyol (PO) in the isocyanate group-containing polyester prepolymer (A) is not particularly limited and may be appropriately selected in accordance with the intended purpose. For example, the amount is preferably 0.5% by mass to 40% by mass, more preferably 1% by mass to 30% by mass, and particularly preferably 2% by mass to 20% by mass. When the amount of the polyol (PO) in the isocyanate group-containing polyester prepolymer (A) is 0.5% by mass or more, deterioration of hot offset resistance can be minimized, and both heat-resistant storage stability and low-temperature fixability of the toner can be easily achieved. When the amount of the polyol (PO) in the isocyanate group-containing polyester prepolymer (A) is 40% by mass or less, low-temperature fixability can be improved.

The polyisocyanate (PIC) is not particularly limited and may be appropriately selected in accordance with the intended purpose. Examples thereof include aliphatic polyisocyanate, alicyclic polyisocyanate, aromatic diisocyanate, araliphatic diisocyanate, isocyanurates, phenol derivatives thereof, and those blocked with, for example, oxime or caprolactam.

Examples of the aliphatic polyisocyanate include tetramethylene diisocyanate, hexamethylene diisocyanate, 2,6-diisocyanatomethyl caproate, octamethylene diisocyanate, decamethylene diisocyanate, dodecamethylene diisocyanate, tetradecamethylene diisocyanate, trimethylhexane diisocyanate, and tetramethylhexane diisocyanate. Examples of the alicyclic polyisocyanate include isophorone diisocyanate and cyclohexylmethane diisocyanate.

Examples of the aromatic diisocyanate include tolylene diisocyanate, diphenylmethane diisocyanate, 1,5-naphthylene diisocyanate, diphenylene-4,4'-diisocyanate, 4,4'-diisocyanato-3,3'-dimethyldiphenyl, 3-methyldiphenylmethane-4,4'-diisocyanate, and diphenyl ether-4,4'-diisocyanate.

Examples of the araliphatic diisocyanate include α, α, α', α'-tetramethylxylylene diisocyanate.

Examples of the isocyanurates include tris-isocyanatoalkyl-isocyanurate and triisocyanatocycloalkyl-isocyanurate.

These may be used alone or in combination.

As the mixing ratio when the polyisocyanate (PIC) is reacted with the active hydrogen group-containing polyester (e.g., hydroxyl group-containing polyester), the mixing equivalent ratio ([NCO]/[OH]) of the isocyanate group [NCO] in the polyisocyanate (PIC) to the hydroxyl group [OH] in the hydroxyl group-containing polyester is preferably 5/1 to 1/1, more preferably 4/1 to 1.2/1, and particularly preferably 3/1 to 1.5/1. When the mixing equivalent ratio ([NCO]/[OH]) is 5/1 or less, the low-temperature fixability can be improved. When the mixing equivalent ratio ([NCO]/[OH]) is 1/1 or more, deterioration of the offset resistance can be minimized.

The amount of the polyisocyanate (PIC) in the isocyanate group-containing polyester prepolymer (A) is not particularly limited and may be appropriately selected in accordance with the intended purpose. For example, the amount is preferably 0.5% by mass to 40% by mass, more preferably 1% by mass to 30% by mass, and still more preferably 2% by mass to 20% by mass. When the amount of the polyisocyanate (PIC) in the isocyanate group-containing polyester prepolymer (A) is 0.5% by mass or more, deterioration of hot offset resistance can be minimized, and both heat-resistant storage stability and low-temperature fixability can be easily achieved. When the amount of the polyisocyanate (PIC) in the isocyanate group-containing polyester prepolymer (A) is 40% by mass or less, low-temperature fixability can be improved.

The average number of isocyanate groups contained in one molecule of the isocyanate group-containing polyester prepolymer (A) is preferably 1 or more, more preferably 1.2 to 5, and still more preferably 1.5 to 4. When the average number of the isocyanate groups is 1 or more, a decrease in the molecular weight of the urea-bond-forming-group-modified polyester (RMPE) can be minimized, and deterioration of hot offset resistance can be minimized.

The weight average molecular weight (Mw) of the polymer capable of reacting with the active hydrogen group-containing compound is preferably 3,000 to 40,000, and more preferably 4,000 to 30,000, in the molecular weight distribution obtained through gel permeation chromatography (GPC) of tetrahydrofuran (THF) soluble matter. When the weight average molecular weight (Mw) of the polymer capable of reacting with the active hydrogen group-containing compound is 3,000 or more, deterioration of heat-resistant storage stability can be minimized. When the weight average molecular weight (Mw) is 40,000 or less, deterioration of low-temperature fixability can be minimized.

The molecular weight distribution can be measured through gel permeation chromatography (GPC) in the following manner. First, a column is stabilized in a heat chamber at 40° C., tetrahydrofuran (THF) as a column solvent is allowed to flow at this temperature at a flow rate of 1 ml per minute. Then, a tetrahydrofuran sample solution (50 μl to 200 μl) of a resin, in which a sample concentration has been adjusted to 0.05% to 0.6% by mass, is injected and measured. In order to measure the molecular weight of the sample, the molecular weight distribution of the sample is calculated from a relationship between the number of counts and the logarithmic value of a calibration curve prepared from several kinds of monodisperse polystyrene standard samples. As standard polystyrene samples for preparing a calibration curve, those having molecular weights of $6\times10^2$, $2.1\times10^2$, $4\times10^2$, $1.75\times10^4$, $1.1\times10^5$, $3.9\times10^5$, $8.6\times10^5$, $2\times10^6$, and $4.48\times10^6$ manufactured by Pressure Chemical Co. or Toyo Soda Kogyo Co. are used. At least about 10 standard polystyrene samples are preferably used. As a detector, an RI (refractive index) detector can be used.

The urea-modified polyester may be used in combination with polyester modified with a chemical bond other than a urea bond such as polyester modified with a urethane bond, in addition to an unmodified polyester.

When the toner composition contains a modified polyester such as a urea-modified polyester, the modified polyester can be produced by, for example, a one shot method.

As an example of the one shot method, a method of producing a urea-modified polyester will be described. First, a polyol and a polycarboxylic acid are heated to 150° C. to 280° C. in the presence of a catalyst such as tetrabutoxy titanate or dibutyl tin oxide, and generated water is removed under reduced pressure as necessary, to obtain polyester having a hydroxyl group. Next, the polyester having a hydroxyl group and polyisocyanate are allowed to react at 40° C. to 140° C. to obtain polyester prepolymer having an isocyanate group. Further, the polyester prepolymer having an isocyanate group is reacted with amines at 0° C. to 140° C., to obtain a urea-modified polyester. In general, the number average molecular weight of the urea-modified polyester is preferably 1,000 to 10,000, and more preferably 1, 500 to 6,000.

When polyester having a hydroxyl group is reacted with polyisocyanate or when polyester prepolymer having an isocyanate group is reacted with amines, a solvent may be used if necessary.

Examples of the solvent include solvents inert to isocyanate groups, such as aromatic solvents (e.g., toluene and xylene); ketones (e.g., acetone, methyl ethyl ketone, and methyl isobutyl ketone); esters (e.g., ethyl acetate); amides (e.g., dimethylformamide and dimethylacetamide); and ethers (e.g., tetrahydrofuran). When an unmodified polyester is used in combination, those produced in the same manner as the polyester having a hydroxyl group may be mixed with the solution obtained after the reaction of the urea-modified polyester.

-Crystalline Polyester-

The toner of the present disclosure contains a crystalline polyester. Toner base particles in the present disclosure may contain a crystalline polyester as a binder resin having an ester bond. The crystalline polyester is obtained by a reaction between an alcohol component and an acid component and has at least a melting point.

Suitable examples of such crystalline polyesters include, but are not limited to, crystalline polyesters synthesized by reacting a saturated aliphatic diol compound having 2 to 12 carbon atoms, particularly an alcohol component selected from 1,4-butanediol, 1,6-hexanediol, 1,8-octanediol, 1,10-decanediol, 1,12-dodecanediol, or derivatives thereof, with dicarboxylic acid having 2 to 12 carbon atoms and having a double bond (C═C bond) or saturated dicarboxylic acid having 2 to 12 carbon atoms, particularly a dicarboxylic acid component selected from fumaric acid, 1,4-butanedioic acid, 1,6-hexanedioic acid, 1,8-octanedioic acid, 1,10-decanedioic acid, 1,12-dodecanedioic acid, and derivatives thereof.

Use of the crystalline polyester makes it possible to minimize such a problem where a carrier or a charging member is contaminated due to a wax (release agent) present on the surfaces of the toner base particles while releasability functions at the time of fixing are maintained without deteriorating the releasing functions, resulting in good results.

The amount of the crystalline polyester is preferably 1 part by mass to 30 parts by mass relative to 100 parts by mass of the toner base particles. When the amount of the crystalline polyester is 1 part by mass or more relative to 100 parts by mass of the toner base particles, a decrease in low-temperature fixability can be minimized. When the amount of the crystalline polyester is 30 parts by mass or less relative to 100 parts by mass of the toner base particles, it is possible to minimize an excessive increase in the amount of the crystalline polyester present on the outermost surface of the toner, to minimize deterioration of image quality due to contamination of a photoconductor and other members, and to minimize a decrease in flowability of the developer and a decrease in image density. In addition, it is possible to minimize deterioration of the surface properties of the toner, to minimize an inability to maintain sufficient chargeability over a long period of time due to contamination of a carrier, and to further minimize inhibition of the environmental stability.

In the present disclosure, as the binder resin component contained in the oil phase, for example, a non-crystalline polyester such as an unmodified polyester and a modified polyester, a crystalline polyester, and a binder resin precursor may be used in combination, but a binder resin component other than these resins may be further contained.

When the polyester is contained as the binder resin component, the amount of the polyester in the binder resin component is preferably 50% by mass or more. When the amount of the polyester in the binder resin component is 50% by mass or more, a decrease in low-temperature fixability can be minimized. Each of the binder resin components is preferably polyester.

-Binder Resin Component Other than Polyester-

Examples of binder resin components other than polyester include styrene or polymers of styrene substitutes such as polystyrene, poly(p-chlorostyrene), and polyvinyltoluene; styrene-based copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-a-methyl chloromethacrylate copolymers, styrene-acrylonitrile copolymers, styrene-methyl vinyl ketone copolymers, styrene-butadiene copolymers, styrene-isoprene copolymers, styrene-acrylonitrile-indene copolymers, styrene-maleic acid copolymers, and styrene-maleate copolymers; polymethyl methacrylate, polybutyl methacrylate, polyvinyl chloride, polyvinyl acetate, polyethylene, polypropylene, epoxy resins, epoxy polyol resins, polyurethane, polyamide, polyvinylbutyral, polyacrylic acid, rosin, modified rosin, terpene resins, aliphatic or alicyclic hydrocarbon resins, aromatic petroleum resins, chlorinated paraffin, and paraffin wax.

Examples of polymer-based protective colloids include acids, (meth)acrylic monomers including a hydroxyl group, vinyl alcohols or ethers of vinyl alcohols, esters of vinyl alcohols and compounds including a carboxyl group, amide compounds or methylol compounds thereof, chlorides, homopolymers or copolymers of, for example, compounds having a nitrogen atom or a heterocyclic ring thereof, polyoxyethylenes, and celluloses.

Examples of acids include acrylic acid, methacrylic acid, a-cyanoacrylic acid, a-cyanomethacrylic acid, itaconic acid, crotonic acid, fumaric acid, maleic acid, and maleic anhydride.

Examples of (meth)acrylic monomers including a hydroxyl group include β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylate, diethylene glycol monomethacrylate, glycerin monoacrylate, glycerin monomethacrylate, N-methylol acrylamide, and N-methylol methacrylamide.

Examples of vinyl alcohol or ethers with vinyl alcohol include vinyl methyl ether, vinyl ethyl ether, and vinyl propyl ether.

Examples of esters of vinyl alcohol and a compound including a carboxyl group include vinyl acetate, vinyl propionate, and vinyl butyrate.

Examples of amide compounds or methylol compounds thereof include acrylamide, methacrylamide, diacetone acrylamide acid, and methylol compounds thereof.

Examples of chlorides include acrylic acid chloride and methacrylic acid chloride.

Examples of compounds having a nitrogen atom or a heterocyclic ring thereof include vinyl pyridine, vinyl pyrrolidone, vinyl imidazole, and ethylene imine.

Examples of polyoxyethylenes include polyoxyethylene, polyoxypropylene, polyoxyethylene alkylamine, polyoxypropylene alkylamine, polyoxyethylene alkylamide, polyoxypropylene alkylamide, polyoxyethylene nonylphenyl ether, polyoxyethylene laurylphenyl ether, polyoxyethylene stearylphenyl ester, and polyoxyethylene nonylphenyl ester.

Examples of celluloses include methyl cellulose, hydroxyethyl cellulose, and hydroxypropyl cellulose.

When a dispersion stabilizer soluble in an acid or an alkali such as calcium phosphate is used, after the calcium phosphate is dissolved with an acid such as hydrochloric acid, the calcium phosphate can be removed from the fine particles by a washing method with water, a decomposing method with an enzyme, or other methods.

<<Colorant>>

The toner of the present disclosure may include a colorant. The colorant is not particularly limited and may be appropriately selected from traditional dyes and pigments in accordance with the intended purpose. Examples thereof include carbon black, nigrosine dyes, iron black, naphtol yellow S, Hansa yellow (10G, 5G, G), cadmium yellow, yellow iron oxide, ocher, chrome yellow, titan yellow, polyazo yellow, oil yellow, hansa yellow (GR, A, RN, R), pigmentary yellow L, benzidine yellow (G, GR), permanent yellow (NCG), balkanfast yellow (5G, R), tartrazine lake, quinoline yellow lake, anthrazan yellow BGL, isoindolinone yellow, red iron oxide, red lead, red lead, cadmium red, cadmium mercury red, antimony vermilion, permanent red 4R, para red, fire red, parachlororthonitroaniline red, lithol fast scarlet G, brilliant fast scarlet, brilliant carmine BS, permanent red (F2R, F4R, FRL, FRLL, F4RH), fast scarlet VD, vulcan fast rubin B, brilliant scarlet G, lithol rubin GX, permanent red F5R, brilliant carmine 6B, pigment scarlet 3B, Bordeaux 5B, toluidine maroon, Permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermillion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS, BC), indigo, ultramarine blue, Prussian blue, anthraquinone blue, fast violet B, methyl violet lake, cobalt violet, manganese violet, dioxane violet, anthraquinone violet, chrome green, zinc green, chromium oxide, viridian, emerald green, pigment green B, naphthol green B, green gold, acid green lake, malachite green lake, phtalocyanine green, anthraquinone green, titanium oxide, zinc flower, and lithopone. These may be used alone or in combination.

The amount of the colorant in the toner is not particularly limited and may be appropriately selected in accordance with the intended purpose, but is preferably 1% by mass to 15% by mass, more preferably 3% by mass to 10% by mass, in the toner base particles. When the amount of the colorant in the toner is 1% by mass or more in the toner base particles, a decrease in tinting strength of the toner can be minimized. When the amount is 15% by mass or less, poor dispersion of the pigment in the toner can be minimized, and a decrease in tinting strength and a decrease in electrical characteristics of the toner can be minimized.

When a resin particle dispersion liquid, an inorganic filler dispersion liquid, a colorant dispersion liquid, and a release agent dispersion liquid are mixed, the amount of the colorant in the colorant dispersion liquid is preferably 50% by mass or less, and more preferably 2% by mass to 40% by mass.

The colorant may be used as a master batch combined with a resin. The resin used in the master batch is not particularly limited and may be appropriately selected from traditional resins according to the intended purpose. Examples thereof include polyester, styrene or polymers of styrene substitutes, styrene-based copolymers, polymethyl methacrylate, polybutyl methacrylate, polyvinyl chloride, polyvinyl acetate, polyethylene, polypropylene, epoxy resins, epoxy polyol resins, polyurethane, polyamide, polyvinyl butyral, polyacrylic acid, rosin, modified rosin, terpene resins, aliphatic hydrocarbon resins, alicyclic hydrocarbon resins, aromatic petroleum resins, chlorinated paraffin, and paraffin wax. These may be used alone or in combination.

Examples of the styrene or polymers of styrene substitutes include polystyrene, poly-p-chlorostyrene, and polyvinyltoluene.

Examples of the styrene-based copolymers include styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-d-methyl chloromethacrylate copolymers, styrene-acrylonitrile copolymers, styrene-methyl vinyl ketone copolymers, styrene-butadiene copolymers, styrene-isoprene copolymers, styrene-acrylonitrile-indene copolymers, styrene-maleic acid copolymers, and styrene-maleic acid ester copolymers.

The master batch can be produced by mixing or kneading a resin for master batch and a colorant under high shearing force. At this time, in order to enhance the interaction between the colorant and the resin, an organic solvent is preferably added. What is known as a flushing method is also suitable because a wet cake of the colorant can be used as is, and does not need to be dried.

The flushing method is a method in which an aqueous paste containing a colorant and water is mixed or kneaded with a resin and an organic solvent, to transfer the colorant to the resin side, thereby removing water and organic solvent components. For the mixing or the kneading, for example, a high-shear dispersing apparatus such as a three-roll mill is suitably used.

<<Surfactant>>

The toner of the present disclosure may include a surfactant.

In the emulsification or dispersion in the oil phase/water phase method, it is preferable to use a dispersing agent as necessary from the viewpoint of stabilizing oil droplets and obtaining a desired shape and a sharp particle size distribution. The dispersing agent is not particularly limited and may be appropriately selected in accordance with the intended purpose. Examples of dispersing agents include surfactants, poorly water-soluble inorganic compound dispersing agents, and polymer-based protective colloids. These may be used alone or in combination. Among them, surfactants are preferable, and examples of anionic surfactants include those described below. Examples of the surfactants include anionic surfactants, cationic surfactants, and nonionic surfactants as described in the following emulsion aggregation method.

Examples of anionic surfactants include alkyl benzene sulfonate, α-olefin sulfonate, and phosphate ester. Anionic surfactants having a fluoroalkyl group are suitably exemplified.

Examples of anionic surfactants having a fluoroalkyl group include fluoroalkylcarboxylic acids having 2 to 10 carbon atoms or metal salts thereof, disodium perfluorooctane sulfonylglutamate, sodium 3-[ω-fluoroalkyl (6 to 11 carbon atoms) oxy]-1-alkyl (3 to 4 carbon atoms) sulfonate, sodium 3-[ω)-fluoroalkanoyl (6 to 8 carbon atoms)-N-ethylamino]-1-propanesulfonate, fluoroalkyl (11 to 20 carbon atoms) carboxylic acids or metal salts thereof, perfluoroalkylcarboxylic acids (7 to 13 carbon atoms) or metal salts thereof, perfluoroalkyl (4 to 12 carbon atoms) sulfonic acids or metal salts thereof, perfluorooctanesulfonic acid diethanolamide, N-propyl-N-(2-hydroxyethyl) perfluorooctane sulfonamide, perfluoroalkyl (6 to 10 carbon atoms) sulfonamide propyltrimethylammonium salts, perfluoroalkyl (6 to 10 carbon atoms)-N-ethylsulfonylglycine salts, and monoperfluoroalkyl (6 to 16 carbon atoms) ethyl phosphate.

Examples of commercially available anionic surfactants having a fluoroalkyl group include: SURFLON S-111, SURFLON S-112, and SURFLON S-113 (manufactured by AGC); FLUORAD FC-93, FLUORAD FC-95, FLUORAD FC-98, and FLUORAD FC-129 (manufactured by 3M Japan); UNIDYNE DS-101 and UNIDYNE DS-102 (manufactured by Daikin Industries, Ltd.); MEGAFACE F-110, MEGAFACE F-120, MEGAFACE F-113, MEGAFACE F-191, MEGAFACE F-812, and MEGAFACE F-833 (manufactured by DIC); F-TOP EF-102, F-TOP EF-103, F-TOP EF-104, F-TOP EF-105, F-TOP EF-112, F-TOP EF-123A, F-TOP EF-123B, F-TOP EF-306A, F-TOP EF-501, F-TOP EF-201, and F-TOP EF-204 (manufactured by Tochem Products, Inc.); and FTERGENT F-100 and FTERGENT F-150 (manufactured by Neos).

<<Release Agent>>

The toner of the present disclosure includes a release agent. The release agent is not particularly limited and may be appropriately selected in accordance with the intended purpose, but is preferably a release agent having a low melting point of 50° C. to 120° C. The release agent having a low melting point, when dispersed in the resin, effectively acts as a release agent between the fixing roller and the toner interface, thereby improving the hot offset property even in an oil-less state (in which no release agent such as oil is applied to the fixing roller).

Suitable examples of release agents include waxes. Examples of waxes include natural waxes such as vegetable waxes (e.g., carnauba wax, cotton wax, Japan wax, and rice bran wax); animal waxes (e.g., bees wax and lanolin wax); mineral waxes (e.g., ozokerite and ceresin); and petroleum waxes (e.g., paraffin, microcrystalline, and petrolatum). In addition to these natural waxes, synthetic hydrocarbon waxes such as Fischer-Tropsch wax and polyethylene wax; and synthetic waxes such as esters, ketones, and ethers can be exemplified. Furthermore, fatty acid amides such as 12-hydroxystearic acid amide, stearic acid amide, phthalic anhydride imide, and chlorinated hydrocarbons; homopolymers or copolymers of polyacrylates such as poly-n-stearyl methacrylate and poly-n-lauryl methacrylate (e.g., a copolymer of n-stearyl acrylate-ethyl methacrylate), which are low-molecular-weight crystalline polymer resins; and crystalline polymers having a long alkyl group in a side chain may be used. These may be used alone or in combination.

The melting point of the release agent is not particularly limited and may be appropriately selected in accordance with the intended purpose, but is preferably 50° C. to 120° C., and more preferably 60° C. to 90° C. When the melting point of the release agent is 50° C. or higher, it is possible to prevent the release agent from adversely affecting heat-resistant storage stability. When the melting point of the release agent is 120° C. or lower, occurrence of cold offset during fixing at a low temperature is easily minimized.

The melt viscosity of the release agent is preferably 5 cps to 1,000 cps, and more preferably 10 cps to 100 cps, as a measured value at a temperature that is higher by 20° C. than the melting temperature of the release agent. When the melt viscosity of the release agent is 5 cps or more, a decrease in releasability can be minimized. When the melt viscosity is 1,000 cps or less, hot offset resistance and low-temperature fixability are improved.

The amount of the release agent in the toner is not particularly limited and may be appropriately selected in accordance with the intended purpose. The amount of the release agent is preferably 40% by mass or less, and more preferably 3% by mass to 30% by mass, in the toner base particles. When the amount of the release agent in the toner is 40% by mass or less in the toner base particles, deterioration of the flowability of the toner can be minimized.

<<Fluidity Improver>>

The toner of the present disclosure may contain a flowability improver. The flowability improver is appropriately used as a toner component such as toner base particles and additives. The flowability improver refers to an agent that performs a surface treatment of toner components (e.g., particles) to increase hydrophobicity and minimize deterioration of flowability characteristics and charging characteristics even under high humidity. Examples thereof include silane coupling agents, silylating agents, silane coupling agents having a fluorinated alkyl group, organic titanate-based coupling agents, aluminum-based coupling agents, silicone oils, and modified silicone oils. Particularly preferably, particles of silica or titanium oxide are surface-treated with such a flowability improver and are used as hydrophobic silica or hydrophobic titanium oxide.

<<Cleanability Improver>>

The toner of the present disclosure may contain a cleanability improver. The cleanability improver is an agent added to the toner in order to remove the developer after the transfer remaining on the photoconductor or the primary transfer medium. Examples thereof include: fatty acid metal salts such as zinc stearate and calcium stearate; and polymer fine particles produced by soap-free emulsion polymerization, such as polymethyl methacrylate fine particles and polystyrene fine particles. The polymer fine particles preferably have a relatively narrow particle size distribution and suitably have a volume average particle diameter of 0.01 μm to 1 μm.

<<Magnetic Material>>

The toner of the present disclosure may contain a magnetic material. The magnetic material is used to the extent that the charging property as toner characteristics is not inhibited. For example, magnetic materials such as metals (e.g., ferrite, magnetite, reduced iron, cobalt, manganese, and nickel), alloys, or compounds containing these metals can be used.

<<Lubricant>>

The toner of the present disclosure may contain a lubricant. Examples of the lubricant include: fatty acid amides such as ethylene bisstearic acid amide and oleic acid amide; and fatty acid metal salts such as zinc stearate and calcium stearate.

<<Polishing Agent>>

The toner of the present disclosure may contain a polishing agent. Examples of polishing agents include silica, alumina, and cerium oxide.

<<Amount of Other Components>>

The amount of the other components may be such an amount that does not inhibit the object of the present disclosure, and is generally an extremely small amount. Specifically, the amount is preferably 0.1% by mass to 2% by mass, and more preferably 0.2% by mass to 1% by mass in the toner base particles.

<<External Additive>>

The toner of the present disclosure includes, for example, toner base particles and an external additive. The external additive is mixed with and attached to the toner base particles using, for example, a Henschel mixer.

As the external additive, inorganic fine particles and organic fine particles can be used. The inorganic fine particles are appropriately used as an external additive for imparting flowability, developability, and chargeability to the toner particles. The inorganic fine particles and organic fine particles can be used as a flowability auxiliary agent and a cleaning auxiliary agent.

The inorganic fine particles are not particularly limited, and may be appropriately selected from traditional inorganic fine particles in accordance with the intended purpose. For example, it is possible to use fine particles composed of, for example, silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, magnesium carbonate, silicon carbide, silicon nitride, and tricalcium phosphate. These may be used alone or in combination.

Examples of organic fine particles include all particles, which are generally used as an external additive on the surface of a toner, such as vinyl-based resins, polyesters, and silicone resins. The addition amount of the external additive can be appropriately changed. For example, the external additive is preferably added in an amount of 0.1 parts by mass to 7.0 parts by mass relative to 100 parts by mass of the toner base particles.

<Production Method of Toner>

A method of producing the toner base particles in the toner of the present disclosure can be appropriately selected in accordance with the intended purpose. For example, a method (oil phase/aqueous phase method), in which an oil phase is dissolved or dispersed in an aqueous phase by, for example, a pulverization method, an emulsion aggregation method that is a polymerization method, or a dissolution suspension method, may be used. In particular, the dissolution suspension method is suitable.

The toner base particles in the present disclosure are preferably granulated in the following manner. Specifically, toner materials including at least polyester and/or a binder resin precursor (modified polyester), a colorant, and a release agent are dissolved or dispersed in an organic solvent, to obtain an oil phase. The oil phase is dispersed in an aqueous medium (aqueous phase), and the organic solvent is removed from the obtained oil phase/aqueous phase (0/W) type dispersion liquid, to granulate the toner base particles. When the O/W type dispersion liquid (emulsified dispersion liquid) is obtained, preferably, the active hydrogen group-containing compound and the polymer capable of reacting with the active hydrogen group-containing compound are dissolved in the oil phase, and then the oil phase is dispersed in an aqueous phase composed of an aqueous medium in which a fine particle dispersing agent is present. Furthermore, the binder resin component is preferably subjected to a cross-linking reaction and/or an elongation reaction in the emulsified dispersion liquid.

That is, the toner base particles are preferably granulated in the following manner. Specifically, a solution or dispersion liquid, which contains an organic solvent, an active hydrogen group-containing compound capable of forming a modified polyester containing at least an ester bond and a bond unit other than the ester bond in the molecular structure, and a polymer capable of reacting with the active hydrogen group-containing compound, is dispersed in an aqueous phase, to form an emulsified dispersion liquid. Then, the active hydrogen group-containing compound and the polymer are subjected to a cross-linking reaction and/or an elongation reaction in the emulsified dispersion liquid, and the organic solvent is removed from the emulsified dispersion liquid, to granulate the toner base particles. The binder resin and/or the binder resin precursor preferably contain(s) a resin material selected from crystalline polyester and non-crystalline polyester.

Hereinafter, raw materials and a production method used for producing the toner base particles in the toner of the present disclosure will be described with reference to examples, but the present disclosure is not limited thereto. Hereinafter, the case (oil phase/aqueous phase method), in which an oil phase is dissolved or dispersed in an aqueous phase to produce toner base particles, such as a dissolution suspension method or an emulsion aggregation method, will be described with reference to examples.

A method of producing the toner base particles of the present disclosure is not particularly limited and may be appropriately selected in accordance with the intended purpose. Examples thereof include a method (oil phase/water phase method) in which an oil phase is dissolved or dispersed in an aqueous phase, such as a pulverization method, an emulsion aggregation method that is a polymerization method, or a dissolution suspension method, to produce toner base particles. The dissolution suspension method is suitably used in order to obtain a toner having a small particle diameter and a small Dv/Dn.

Each of the production methods can be specifically produced as follows.

<<Pulverization Method>>

The pulverization method is, for example, a method in which toner base particles are obtained by charging a mixture including toner materials into a melt-kneading machine, melting and kneading the mixture, pulverizing the kneaded mixture, and classifying the pulverized mixture. In the pulverization method, for the purpose of adjusting the average circularity of the toner, the shape may be controlled by applying a mechanical impact force to the obtained toner base particles. In this case, the mechanical impact force can be applied by using, for example, a device such as a hybridizer or mechanofusion.

Examples of the oil phase/aqueous phase method in which an oil phase containing toner materials is dispersed in an aqueous phase composed of an aqueous medium for granulation include a dissolution suspension method and an emulsion aggregation method. The respective methods are as follows.

<<Dissolution Suspension Method>>

In the production method of the toner base particles constituting the toner of the present disclosure, a dissolved substance or a dispersed substance (oil phase) formed by dissolving or dispersing, in an organic solvent, toner materials containing a binder resin or a binder resin raw material and a colorant as main components is emulsified or dispersed in an aqueous medium (aqueous phase) to prepare an emulsified or dispersed liquid, followed by granulation.

In the method of producing the toner base particles, preferably, a solution or dispersion liquid (oil phase) of toner materials containing at least an active hydrogen group-containing compound and a polymer capable of reacting with the active hydrogen group-containing compound is emulsified or dispersed in an aqueous medium (aqueous phase), and the active hydrogen group-containing compound and the polymer capable of reacting with the active hydrogen group-containing compound are allowed to react in the aqueous medium, followed by granulation. An adhesive base material that will be described later is preferably produced by reacting an active hydrogen group-containing compound with a polymer capable of reacting with the active hydrogen group-containing compound in an aqueous medium.

In particular, the toner base particles are preferably granulated in the following manner. A solution or dispersion liquid, which contains an organic solvent, an active hydrogen group-containing compound capable of forming a modified polyester containing at least an ester bond and a bond unit other than the ester bond in the molecular structure, and a polymer capable of reacting with the active hydrogen group-containing compound, is dispersed in an aqueous phase, to form an emulsified dispersion liquid. Next, the active hydrogen group-containing compound and the polymer are subjected to a cross-linking reaction and/or an elongation reaction in the emulsified dispersion liquid. Then, the organic solvent is removed from the emulsified dispersion liquid, to granulate toner base particles. A polymer, which is obtained by subjecting an active hydrogen group-containing compound and a polymer capable of reacting with the active hydrogen group-containing compound to a cross-linking reaction and/or an elongation reaction, is a modified polyester and has a function as an adhesive base material.

The solution or dispersion liquid of the toner material is prepared by dissolving or dispersing the toner materials in an organic solvent. The toner materials are not particularly limited as long as the toner can be formed, and may be appropriately selected in accordance with the intended purpose. For example, the toner materials may contain any one of an active hydrogen group-containing compound and a polymer (prepolymer) capable of reacting with the active hydrogen group-containing compound, and may further contain the above-mentioned other components such as an unmodified polyester, a release agent, and a colorant, if necessary.

The solution or dispersion liquid of the toner materials is preferably prepared by dissolving or dispersing toner materials in an organic solvent.

In the dissolving or dispersing step, a dispersing machine is preferably used in order to bring the inorganic filler into a finely dispersed state. The dispersing machine is not particularly limited, and examples thereof include high-speed rotation shearing-type dispersing machines and media-type dispersing machines. For the method of producing the toner particles of the present disclosure, a media-type dispersing machine is particularly preferable from the viewpoint of excellent micronization of the materials. The media-type dispersing machine is a dispersing machine having the following principle. Speficically, fine beads made of a material such as metal or ceramic are stirred in a dispersion chamber, and materials in a dispersion liquid are finely dispersed by collision of the beads with each other. The organic solvent is preferably removed during or after the granulation of the toner.

The organic solvent for dissolving or dispersing the toner materials is not particularly limited as long as it is a solvent capable of dissolving or dispersing the toner materials, and may be appropriately selected in accordance with the intended purpose. An organic solvent having a boiling point of less than 150° C. is preferable from the viewpoint of easy removal during or after granulation of the toner. For example, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone can be used. An ester-based solvent is preferable, and ethyl acetate is particularly preferable. These may be used alone or in combination.

The amount of the organic solvent used for dissolving or dispersing the toner materials is not particularly limited and may be appropriately selected in accordance with the intended purpose. The amount of the organic solvent used for dissolving or dispersing the toner material is preferably 40 parts by mass to 300 parts by mass, more preferably 60 parts by mass to 140 parts by mass, and still more preferably 80 parts by mass to 120 parts by mass, relative to 100 parts by mass of the toner materials. The solution or dispersion liquid of the toner materials can be prepared by dissolving or dispersing toner materials such as an active hydrogen group-containing compound, a polymer capable of reacting with the active hydrogen group-containing compound, an unmodified polyester, a release agent, a colorant, and a charge control agent in an organic solvent.

The components other than the polymer (prepolymer) capable of reacting with the active hydrogen group-containing compound in the toner materials may be added to and mixed with the aqueous medium in the preparation of the aqueous medium that will be described below, or may be added to the aqueous medium together with the solution or dispersion liquid when the solution or dispersion liquid of the toner materials is added to the aqueous medium.

The aqueous medium is not particularly limited and can be appropriately selected from traditional aqueous media. For example, water, a solvent miscible with water, and a mixture thereof can be used. Among them, water is preferable. The solvent miscible with water is not particularly limited, and examples thereof include alcohols, dimethylformamide, tetrahydrofuran, cellosolves, and lower ketones. Examples of alcohols include methanol, isopropanol, and ethylene glycol. Examples of lower ketones include acetone and methyl ethyl ketone. These may be used alone or in combination.

The solution or dispersion liquid of the toner materials is preferably emulsified or dispersed in an aqueous medium while the solution or dispersion liquid of the toner materials is stirred in the aqueous medium. The dispersing method is not particularly limited and may be appropriately selected in accordance with the intended purpose. For example, a traditional dispersing machine may be used. Examples of dispersing machines include low-speed shearing dispersing machines and high-speed shearing dispersing machines. In this method of producing the toner, when the active hydrogen group-containing compound and the polymer capable of reacting with the active hydrogen group-containing compound are subjected to an elongation reaction or a cross-linking reaction at the time of emulsification or dispersion, an adhesive base material (binder resin) is produced.

The organic solvent is removed from the emulsified slurry obtained through emulsification or dispersion. Examples of the method of removing the organic solvent include: (1) a method in which the temperature of the entire reaction system is gradually increased to completely evaporate and remove the organic solvent in the oil droplets; and (2) a method in which the emulsified dispersing element is sprayed in a dry atmosphere, and the water-insoluble organic solvent in the oil droplets is completely removed, to form toner fine particles and to evaporate and remove the aqueous dispersing agent.

When the organic solvent is removed, toner base particles are formed. The formed toner base particles are washed. After washing, an aqueous slurry in which the toner is dispersed is subjected to a heat treatment, and the obtained product is dehydrated and dried, followed by classification if desired. The classification is carried out by removing fine particle parts in a liquid by, for example, a cyclone, a decanter, or centrifugal separation. The classification operation may be performed after the powder is obtained after drying.

Next, an external additive is added to the surfaces of the toner base particles to obtain a toner.

<<Emulsion Aggregation Method>>

In the emulsion polymerization aggregation fusion method, an oil phase containing toner materials or a monomer phase is dispersed and/or emulsified in an aqueous medium (aqueous phase) and granulated to obtain toner base particles. When the emulsion polymerization aggregation fusion method is applied to the production of the toner base particles constituting the toner of the present disclosure, the target characteristics of the present disclosure are easily obtained. That is, the target characteristics of the present disclosure can be easily obtained when the toner base particles are produced by the emulsion polymerization aggregation fusion method (abbreviated as an emulsion aggregation method), in which a resin particle dispersion liquid prepared by emulsion polymerization and a dispersion liquid containing, for example, a colorant and a release agent are hetero-aggregated, followed by fusion and coalescence.

The emulsion polymerization aggregation fusion method includes: a step of preparing an aggregated particle dispersion liquid (hereinafter may be referred to as "aggregation step") in which a resin particle dispersion liquid prepared by the emulsion polymerization method, a colorant dispersion liquid, and optionally a release agent dispersion liquid are mixed to aggregate the resin particles and the colorant to form aggregated particles; and a step of heating and fusing the aggregated particles to form toner particles (hereinafter may be referred to as "fusion step").

In the aggregation step, the resin particle dispersion liquid, the colorant dispersion liquid, and optionally the release agent dispersion liquid are mixed with each other, and the resin particles are aggregated to form aggregated particles. The aggregated particles are formed by, for example, heteroaggregation. At that time, an ionic surfactant having a polarity different from that of the aggregated particles or a compound having monovalent or higher electric charges such as a metal salt can be added for the purpose of stabilizing the aggregated particles and controlling the particle diameter/particle size distribution. In the fusion step, the aggregated particles are melted by heating the aggregated particles to a temperature equal to or higher than the glass transition point of the resin in the aggregated particles.

Before the fusion step, an adhesion step can be provided. In the adhesion step, another fine particle dispersion liquid is added to and mixed with the aggregated particle dispersion liquid, and the fine particles are allowed to uniformly adhere to the surfaces of the aggregated particles, to form adhered particles.

The fused particles fused in the fusion step are present as a colored fused particle dispersion liquid in an aqueous medium. The fused particles are taken out from the aqueous medium in a washing step, and at the same time, impurities and the like mixed in each step are removed, followed by drying, to obtain toner base particles in the form of powder.

In the washing step, an acidic water or, in some cases, basic water is added to the fused particles in an amount that is several times the amount of the fused particles, followed by stirring and filtration, to obtain a solid content. Pure water is added thereto in an amount that is several times the amount of the solid content, and the mixture is stirred and then filtered. This is repeated several times until the pH of the filtrate after filtration reaches about 7. Then, the aqueous slurry in which the toner is dispersed is heat-treated to obtain colored toner particles. In the drying step, the toner particles obtained in the washing step are dried at a temperature lower than the glass transition point. At this time, if necessary, a method of circulating dry air or a method of heating under vacuum conditions is employed.

Next, an external additive is added to the surfaces of the toner base particles obtained by drying, to obtain a toner.

In the present disclosure, in order to stabilize the dispersibility of the resin particle dispersion liquid, the colorant dispersion liquid, and the release agent dispersion liquid, the alicyclic compound of the organic acid metal salt as an emulsifier can be used as is. However, when the dispersion is not necessarily stable under basic conditions due to the pH stability of the colorant dispersion liquid and the release agent dispersion liquid, or for the reason of the temporal stability of the resin particle dispersion liquid, a slight amount of a surfactant can be used.

Examples of surfactants include anionic surfactants such as sulfate ester salts, sulfonate salts, phosphate esters, and soaps; cationic surfactants such as amine salts and quaternary ammonium salts; and nonionic surfactants such as polyethylene glycols, alkylphenol ethylene oxide adducts, and polyhydric alcohols.

Among them, ionic surfactants are preferable, and anionic surfactants and cationic surfactants are more preferable. In the toner of the present disclosure, since an anionic surfactant generally has a strong dispersing force and is excellent in dispersibility of resin particles and a colorant, a cationic surfactant is advantageous as a surfactant for dispersing a release agent. A nonionic surfactant is preferably used in combination with an anionic surfactant or a cationic surfactant.

The surfactant may be used alone or in combination. Specific examples of anionic surfactants include: fatty acid soaps such as potassium laurate, sodium oleate, and sodium castor oil; sulfates such as octyl sulfate, lauryl sulfate, lauryl ether sulfate, and nonylphenyl ether sulfate; sulfonates such as lauryl sulfonate, dodecylbenzenesulfonate, triisopropylnaphthalenesulfonate, sodium alkylnaphthalenesulfonate (e.g., dibutylnaphthalenesulfonate), naphthalenesulfonate-formalin condensates, monooctylsulfosuccinate, dioctylsulfosuccinate, lauramidesulfonate, and oleamidesulfonate; phosphates such as laurylphosphate, isopropylphosphate, and nonylphenyletherphosphate; dialkylsulfosuccinates such as dioctylsodium sulfosuccinate; and sulfosuccinates such as disodium laurylsulfosuccinate.

Specific examples of cationic surfactants include: amine salts such as laurylamine hydrochloride, stearylamine hydrochloride, oleylamine acetate, stearylamine acetate, and stearylaminopropylamine acetate; and quaternary ammonium salts such as lauryltrimethylammonium chloride, dilauryldimethylammonium chloride, distearylammonium chloride, distearyldimethylammonium chloride, lauryldihydroxyethylmethylammonium chloride, oleylbispolyoxyethylenemethylammonium chloride, lauroylaminopropyldimethylethylammonium ethosulfate, lauroylaminopropyldimethylhydroxyethylammonium perchlorate, alkylbenzenedimethylammonium chloride, and alkyltrimethylammonium chloride.

Specific examples of nonionic surfactants include: alkyl ethers such as polyoxyethylene octyl ether, polyoxyethylene lauryl ether, polyoxyethylene stearyl ether, and polyoxyethylene oleyl ether; alkyl phenyl ethers such as polyoxyethylene octylphenyl ether and polyoxyethylene nonylphenyl ether; alkyl esters such as polyoxyethylene laurate, polyoxyethylene stearate, and polyoxyethylene oleate; alkyl amines such as polyoxyethylene lauryl aminoether, polyoxyethylene stearyl aminoether, polyoxyethylene oleyl aminoether, polyoxyethylene soybean aminoether, and polyoxyethylene beef tallow aminoether; alkyl amides such as polyoxyethylene lauric acid amide, polyoxyethylene stearic acid amide, and polyoxyethylene oleic acid amide; vegetable oil ethers such as polyoxyethylene castor oil ether and polyoxyethylene rapeseed oil ether; alkanol amides such as lauric acid diethanolamide, stearic acid diethanolamide, and oleic acid diethanolamide; and sorbitan ester ethers such as polyoxyethylene sorbitan monolaurate, polyoxyethylene sorbitan monopalmitate, polyoxyethylene sorbitan monostearate, and polyoxyethylene sorbitan monooleate.

The amount of the surfactant in each dispersion liquid may be an extent that does not inhibit the characteristics of the present disclosure, and is generally a small amount. Specifically, in the case of the resin particle dispersion liquid, the amount is preferably 0.01% by mass to 1% by mass, more preferably 0.02% by mass to 0.5% by mass, and still more preferably 0.1% by mass to 0.2% by mass. When the amount of the surfactant in each dispersion liquid is 0.01% by mass or more, aggregation can be minimized particularly in a state where the pH of the resin particle dispersion liquid is not sufficiently basic.

The amount of the surfactant in the case of the colorant dispersion liquid or the release agent dispersion liquid is preferably 0.01% by mass to 10% by mass, more preferably 0.1% by mass to 5% by mass, and still more preferably 0.5% by mass to 0.2% by mass. When the amount of the surfactant is 0.01% by mass or more, the separation of the specific particles can be minimized because the stability is different among the respective particles at the time of aggregation. When the amount of the surfactant is 10% by mass or less, problems such as widened particle size distribution of the particles and difficulty in controlling the particle diameter can be minimized.

In the present disclosure, for example, an aqueous medium is used as a dispersion medium of the resin particle dispersion liquid, the colorant dispersion liquid, the release agent dispersion liquid, or the dispersion liquids of other components. Specific examples of the aqueous medium include water such as distilled water and ion-exchanged water, and alcohol. These may be used alone or in combination.

In the step of preparing the aggregated particle dispersion liquid, the emulsification power of the emulsifier is adjusted by pH to cause aggregation, whereby aggregated particles can be prepared. At the same time, an aggregating agent may be added in order to stably and rapidly aggregate particles to obtain aggregated particles having a narrower particle size distribution.

The aggregating agent is preferably a compound having monovalent or higher electric charges. Specific examples thereof include: water soluble surfactants such as the ionic surfactants and the non-ionic surfactants; acids such as hydrochloric acid, sulfuric acid, nitric acid, acetic acid, and oxalic acid; metal salts of inorganic acids such as magnesium chloride, sodium chloride, aluminum sulfate, calcium sulfate, ammonium sulfate, aluminum nitrate, silver nitrate, copper sulfate, and sodium carbonate; metal salts of aliphatic acids and aromatic acids such as sodium acetate, potassium formate, sodium oxalate, sodium phthalate, and potassium salicylate; metal salts of phenols such as sodium phenolate; metal salts of amino acids; and inorganic acid salts of aliphatic amines and aromatic amines such as triethanolamine hydrochloride and aniline hydrochloride. In consideration of the stability of the aggregated particles, the stability of the aggregating agent during heating, the stability of the aggregating agent over time, and the removal at the time of washing, metal salts of inorganic acids are preferable in terms of performance and use.

The addition amount of these aggregating agents varies depending on the valence of the electric charges, but is a small amount in all cases. The addition amount is preferably 3% by mass or less when the valence of the electric charges is monovalent. The addition amount is preferably 1% by mass or less when the valence of the electric charges is divalent. The addition amount is preferably 0.5% by mass or less when the valence of the electric charges is trivalent. The addition amount of the aggregating agent is preferably a small amount, and a compound having a large valence is suitable because the addition amount can be reduced.

<<Example of Method of Producing Toner>>

An example of a method of producing the toner of the present disclosure includes: dispersing, in an aqueous medium, an oil phase including a binder resin and a binder resin precursor, and a release agent; and washing a slurry obtained by the dispersing and subjecting the slurry to a heat treatment. The binder resin includes a crystalline polyester and an amorphous polyester. The heat treatment is performed at 40° C. or more and 50° C. or less. As described above, the heating makes it possible to adjust the partial miscibility between the crystalline polyester and the amorphous polyester to an appropriate range.

The partial miscibility between the crystalline polyester and the amorphous polyester can be controlled by, for example, the conditions of the heating. However, it is difficult to uniquely define the partial miscibility because the partial miscibility varies depending on the kind of crystalline polyester, the kind of amorphous polyester, and the blending ratio thereof. As an example of the conditions of the heating, a heat treatment is performed at 40° C. or more and 50° C. or less. In this case, the partial miscibility between the crystalline polyester and the amorphous polyester can be easily adjusted to an appropriate range. The heat treatment is preferably performed for 5 minutes or more and 60 minutes or less.

In the above description, the temperature of the heating is set to 40° C. or more and 50° C. or less, but the heating may be performed at Tg−5.0° C. or more and Tg+5.0° C. or less. Even in this case, the partial miscibility between the crystalline polyester and the amorphous polyester can be adjusted to an appropriate range.

(Developer)

A developer of the present disclosure contains the toner of the present disclosure and may be either a one-component developer including the toner of the present disclosure or a two-component developer including the toner of the present disclosure and a carrier. When the developer is used in, for example, a high-speed printer corresponding to an improvement in information processing speed, a two-component developer is preferably used from the viewpoint of lifetime.

The two-component developer of the present disclosure includes the toner of the present disclosure, and the carrier contained in the developer is not particularly limited.

<Carrier>

The carrier is not particularly limited and may be appropriately selected in accordance with the intended purpose. The carrier preferably includes a core material and a resin layer covering the core material.

The material of the core material is not particularly limited. Examples thereof include manganese-strontium (Mn—Sr)-based materials, manganese-magnesium (Mn—Mg)-based materials, iron powder, magnetite, and copper-zinc (Cu—Zn)-based materials. The material of the resin layer is not particularly limited and may be appropriately selected from traditional resins in accordance with the intended purpose.

(Toner-Storing Unit)

A toner-storing unit of the present disclosure stores the toner of the present disclosure. The toner-storing unit in the present disclosure includes: a unit having a function of storing a toner; and a toner stored in the unit. Here, examples of the toner-storing unit include a toner storage container, a developing device, and a process cartridge.

The toner storage container refers to a container that stores a toner.

The developing device refers to a device having a unit that stores a toner and is configured to develop the toner.

The process cartridge refers to a cartridge, which includes at least an image bearer and a developing unit that are integrated, stores a toner, and is detachably mountable to an image forming apparatus. The process cartridge may further include at least one selected from a charging unit, an exposure unit, and a cleaning unit.

The toner-storing unit of the present disclosure is attached to an image forming apparatus to form an image using the toner of the present disclosure. Therefore, excellent low-temperature fixability and storage stability can be achieved, good offset resistance can be achieved, and a high-quality image having good sharpness can be formed over a long period of time.

(Image Forming Method and Image Forming Apparatus)

An image forming method of the present disclosure includes: an electrostatic latent image forming step (charging step and exposure step) of forming an electrostatic latent image on an electrostatic latent image bearer; a developing step of developing the electrostatic latent image with the developer of the present disclosure to form a visible image; a transferring step of transferring the visible image onto a recording medium; and a fixing step of fixing a transfer image transferred onto the recording medium. The method further includes other steps appropriately selected as necessary, such as a charge-eliminating step, a cleaning step, a recycling step, and a controlling step.

An image forming apparatus of the present disclosure includes an electrostatic latent image bearer, an electrostatic latent image forming unit (charging unit and exposure unit) configured to form an electrostatic latent image on the electrostatic latent image bearer, a developing unit configured to develop the electrostatic latent image with the developer of the present disclosure to form a visible image, a transfer unit configured to transfer the visible image onto a recording medium, and a fixing unit configured to fix a transfer image transferred onto the recording medium. The image forming apparatus further includes other units appropriately selected as necessary, such as a charge-eliminating unit, a cleaning unit, a recycling unit, and a control unit.

The toner of the present disclosure has a sufficiently high chargeability, forms an image with less background stain, does not scatter in a device, and can achieve low-temperature fixability. Therefore, according to the image forming method and the image forming apparatus of the present disclosure, the toner can be adapted to an image forming system that requires high speed and high reliability, and can provide a high-quality image without occurrence of an abnormal image.

-Electrostatic Latent Image Forming Step and Electrostatic Latent Image Forming Unit- The electrostatic latent image forming step is a step of forming an electrostatic latent image on an electrostatic latent image bearer.

The electrostatic latent image bearer (also referred to as "electrophotographic photoconductor" or "photoconductor") is not particularly limited in terms of, for example, material, shape, structure, and size, and may be appropriately selected from traditional photoconductors. Suitable examples of the shape include a drum shape. Examples of the material include inorganic photoconductors including, for example, amorphous silicon and selenium, and organic photoconductors (OPC) including, for example, polysilane and phthalopolymethine. Among them, an organic photoconductor (OPC) is preferable because an image with higher definition can be obtained.

The electrostatic latent image can be formed by, for example, uniformly charging the surface of the electrostatic latent image bearer and then exposing the surface of the electrostatic latent image bearer to light in an imagewise manner. The electrostatic latent image can be formed by an electrostatic latent image forming unit.

The electrostatic latent image forming unit includes, for example, at least a charging unit (charger) configured to uniformly charge the surface of the electrostatic latent image bearer, and an exposure unit (exposure device) configured to expose the surface of the electrostatic latent image bearer to light in an imagewise manner.

The charging can be performed by, for example, applying a voltage to the surface of the electrostatic latent image bearer using the charger.

The charger is not particularly limited and may be appropriately selected in accordance with the intended purpose. Examples thereof include: traditional contact chargers provided with, for example, a conductive or semiconductive roller, brush, film, or rubber blade; and non-contact chargers using corona discharge such as corotron and scorotron.

The charger is disposed in contact or non-contact with the electrostatic latent image bearer, and preferably applies a DC voltage and an AC voltage in a superimposed manner to charge the surface of the electrostatic latent image bearer.

Preferably, the charger is a charging roller disposed close to the electrostatic latent image bearer via a gap tape in a non-contact manner, and applies a DC voltage and an AC voltage to the charging roller in a superimposed manner, to charge the surface of the electrostatic latent image bearer.

The exposure can be performed by, for example, exposing the surface of the electrostatic latent image bearer to light using the exposure device in an imagewise manner.

The exposure device is not particularly limited and may be appropriately selected in accordance with the intended purpose as long as it can expose the surface of the electrostatic latent image bearer charged by the charger to light in an imagewise manner. Examples thereof include various exposure devices such as copying optical systems, rod lens array systems, laser optical systems, and liquid crystal shutter optical systems.

In the present disclosure, a back-light system in which imagewise exposure is performed from the back side of the electrostatic latent image bearer may be employed.

-Developing Step and Developing Unit-

The developing step is a step of developing the electrostatic latent image with the toner to form a visible image.

The visible image can be formed by, for example, developing the electrostatic latent image with the toner by the developing unit.

The developing unit suitably includes at least a developing device that accommodates the toner and can apply the toner to the electrostatic latent image in a contact or non-contact manner, and more preferably includes a developing device that includes a container including the toner.

The developing device may be a developing device for a single color or a developing device for multiple colors. Suitable examples thereof include a developing device, which includes: a stirring device configured to subject the toner to friction stirring to charge the toner; and a rotatable magnet roller.

In the developing device, for example, the toner and the carrier are mixed and stirred. The toner is charged by friction at that time, and is held on the surface of the rotating magnet roller in the form of brush. Then, a magnetic brush is formed. Since the magnet roller is disposed in the vicinity of the electrostatic latent image bearer (photoconductor), a part of the toner constituting the magnetic brush formed on the surface of the magnet roller moves to the surface of the electrostatic latent image bearer (photoconductor) by an electric attraction force. As a result, the electrostatic latent image is developed with the toner, to form a visible image with the toner on the surface of the electrostatic latent image bearer (photoconductor).

-Transfer Step and Transfer Unit-

The transfer step is a step of transferring the visible image onto a recording medium. The transfer step is preferably an embodiment in which an intermediate transfer member is used to primarily transfer a visible image onto the intermediate transfer member and then the visible image is secondarily transferred onto the recording medium, and is more preferably an embodiment that includes a primary transfer step of forming a composite transfer image by transferring the visible image onto the intermediate transfer member using a toner of two or more colors, preferably using a full-color toner, and a secondary transfer step of transferring the composite transfer image onto the recording medium.

The visible image can be transferred by, for example, charging the electrostatic latent image bearer (photoconductor) using a transfer charger, and can be performed by the transfer unit. The transfer unit is preferably an embodiment that includes: a primary transfer unit configured to transfer a visible image onto an intermediate transfer member to form a composite transfer image; and a secondary transfer unit configured to transfer the composite transfer image onto a recording medium. The intermediate transfer member is not particularly limited and may be appropriately selected from traditional transfer members in accordance with the intended purpose. Examples thereof include transfer belts.

The transfer unit (the primary transfer unit and the secondary transfer unit) preferably includes at least a transfer device configured to peel and charge the visible image formed on the electrostatic latent image bearer (photoconductor) to the recording medium side. The number of the transfer units may be one, or may be two or more. Examples of transfer devices include corona transfer devices using corona discharge, transfer belts, transfer rollers, pressure transfer rollers, and adhesive transfer devices. The recording medium is not particularly limited and may be appropriately selected from traditional recording media (recording paper).

-Fixing Step and Fixing Unit-

The fixing step is a step of fixing the visible image transferred onto the recording medium using a fixing device. The fixing step may be performed for each color developer each time the visible image is transferred onto the recording medium, or may be simultaneously performed for each color developer with the respective color developers being superimposed.

The fixing device is not particularly limited and may be appropriately selected in accordance with the intended purpose, but a traditional heating and pressing unit is suitable. Examples of heating and pressing units include combination of a heating roller and a pressing roller, and a combination of a heating roller, a pressing roller, and an endless belt.

Preferably, the fixing device includes a heating body including a heating element, a film in contact with the heating body, and a pressing member pressed against the heating body via the film, and is a means for passing a recording medium on which an unfixed image is formed between the film and the pressing member to heat and fix the image. Generally, the heating in the heating and pressing unit is preferably 80° C. to 200° C. In the present disclosure, for example, a traditional optical fixing device may be used together with or instead of the fixing step and the fixing unit, in accordance with the intended purpose.

-Other Steps and Other Units-

The charge-eliminating step is a step of applying a charge-eliminating bias to the electrostatic latent image bearer to eliminate charges, and can be suitably performed by a charge-eliminating unit.

The charge-eliminating unit is not particularly limited as long as it can apply a charge-eliminating bias to the electrostatic latent image bearer, and may be appropriately selected from traditional charge-eliminating devices. Suitable examples thereof include charge-eliminating lamps.

The cleaning step is a step of removing the toner remaining on the electrostatic latent image bearer, and can be suitably performed by a cleaning unit.

The cleaning unit is not particularly limited as long as the toner remaining on the electrostatic latent image bearer can be removed, and may be appropriately selected from traditional cleaners. Suitable examples thereof include magnetic brush cleaners, electrostatic brush cleaners, magnetic roller cleaners, blade cleaners, brush cleaners, and web cleaners.

The recycling step is a step of recycling the toner removed in the cleaning step to the developing unit, and can be suitably performed by a recycling unit. The recycling unit is not particularly limited, and examples thereof include known conveying units.

The control step is a step of controlling each step described above, and each step can be suitably performed by a control unit.

The control unit is not particularly limited as long as it can control the movement of each unit, and may be appropriately selected in accordance with the intended purpose. Examples thereof include devices such as sequencers and computers.

Figure 2:
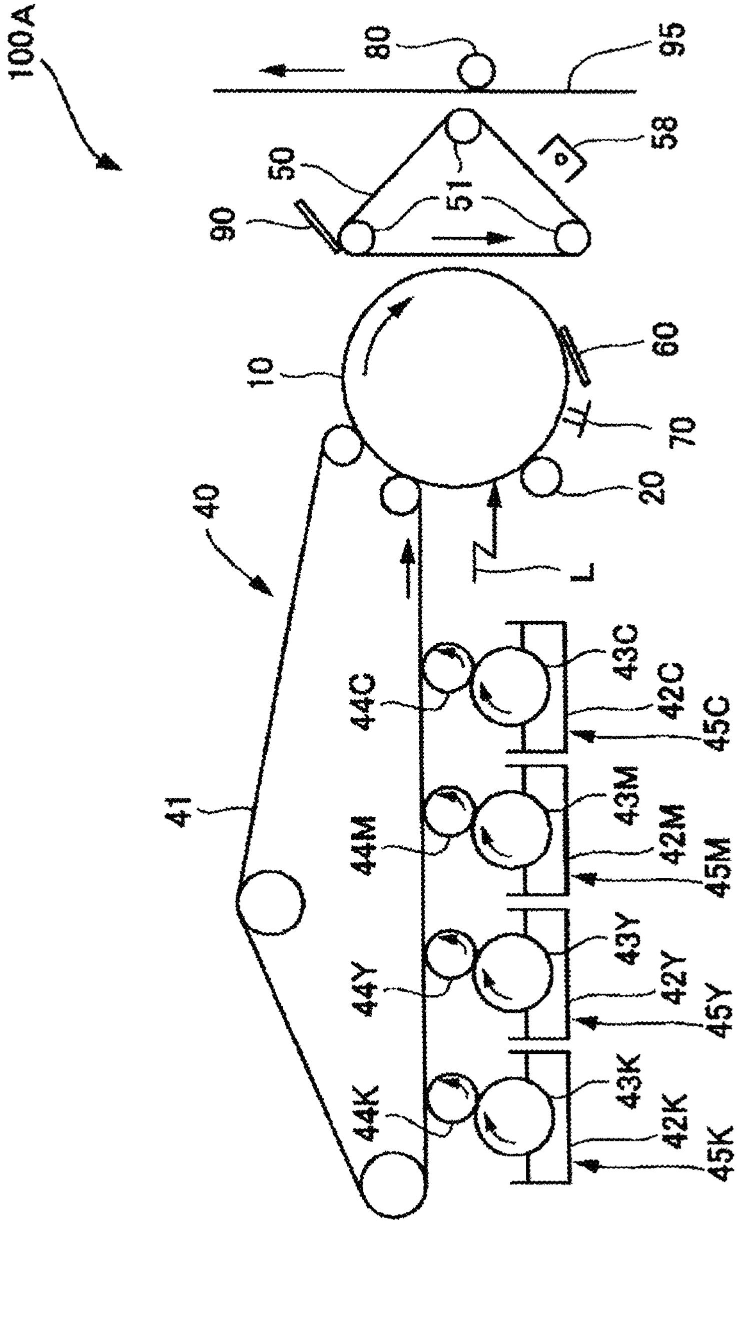
FIG. 2 is a schematic view illustrating an example of an image forming apparatus according to the present disclosure.

FIG. 2 depicts a first example of an image forming apparatus of the present disclosure. An image forming apparatus 100A includes a photoconductor drum 10, a charging roller 20, an exposure device, a developing device 40, an intermediate transfer belt 50, a cleaning device 60 including a cleaning blade, and a charge-eliminating lamp 70.

The intermediate transfer belt 50 is an endless belt stretched by three rollers 51 disposed inside, and can move in a direction indicated by an arrow in FIG. 1. Some of the three rollers 51 also function as transfer bias rollers capable of applying a transfer bias (primary transfer bias) to the intermediate transfer belt 50. A cleaning device 90 including a cleaning blade is disposed in the vicinity of the intermediate transfer belt 50. Further, a transfer roller 80 capable of applying a transfer bias (secondary transfer bias) for transferring a toner image onto transfer paper 95 is disposed so as to face the intermediate transfer belt 50. Furthermore, around the intermediate transfer belt 50, a corona charging device 58 configured to apply electric charges to the toner image transferred onto the intermediate transfer belt 50 is disposed between a contact portion between the photoconductor drum 10 and the intermediate transfer belt 50 and a contact portion between the intermediate transfer belt 50 and the transfer paper 95 with respect to a rotation direction of the intermediate transfer belt 50.

The developing device 40 includes a developing belt 41, and a black developing unit 45K, a yellow developing unit 45Y, a magenta developing unit 45M, and a cyan developing unit 45C that are provided around the developing belt 41. The developing units 45 for the respective colors include developer stored units 42 (42K, 42Y, 42M, and 42C), developer supplying rollers 43 (43K, 43Y, 43M, and 43C), and developing rollers (developer carrying members) 44 (44K, 44Y, 44M, and 44C). The developing belt 41 is an endless belt stretched by a plurality of belt rollers and can move in a direction indicated by an arrow in the figure. Further, a part of the developing belt 41 is in contact with the photoconductor drum 10.

Next, a method of forming an image using the image forming apparatus 100A will be described. First, the surface of the photoconductor drum 10 is uniformly charged using the charging roller 20, and then the photoconductor drum 10 is exposed to exposure light L using the exposure device to form an electrostatic latent image. Next, the electrostatic latent image formed on the photoconductor drum 10 is developed with a toner supplied from the developing device 40, to form a toner image. Further, the toner image formed on the photoconductor drum 10 is transferred (primarily transferred) onto the intermediate transfer belt 50 by a transfer bias applied from the roller 51, and then is transferred (secondarily transferred) onto the transfer paper 95 by a transfer bias applied from the transfer roller 80. On the other hand, after the toner image has been transferred onto the intermediate transfer belt 50, the toner remaining on the surface of the photoconductor drum 10 is removed by the cleaning device 60, and charges are eliminated by the charge-eliminating lamp 70.

Figure 3:
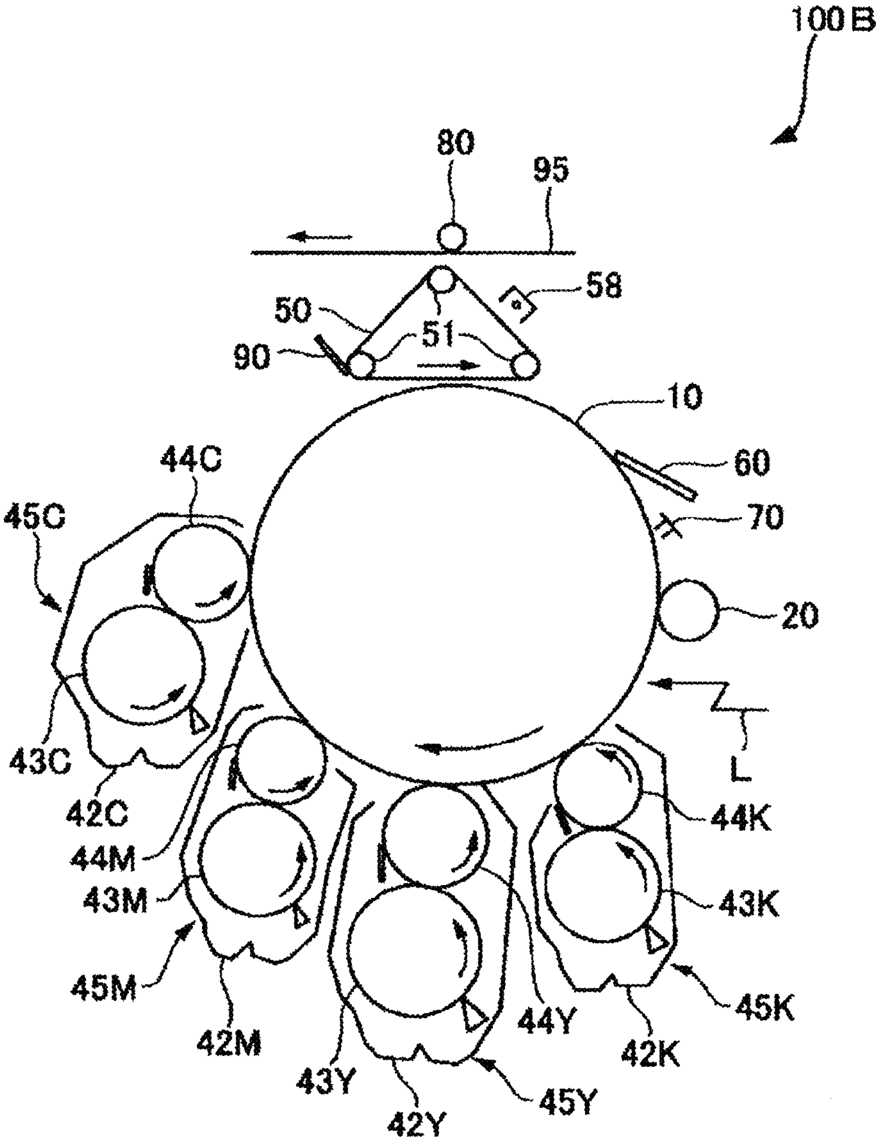
FIG. 3 is a schematic view illustrating another example of an image forming apparatus according to the present disclosure.

FIG. 3 depicts a second example of the image forming apparatus used in the present disclosure. An image forming apparatus 100B has the same configuration as that of the image forming apparatus 100A except that the developing belt 41 is not provided and a black developing unit 45K, a yellow developing unit 45Y, a magenta developing unit 45M, and a cyan developing unit 45C are directly disposed around a photoconductor drum 10 so as to face the photoconductor drum 10.

Figure 4:
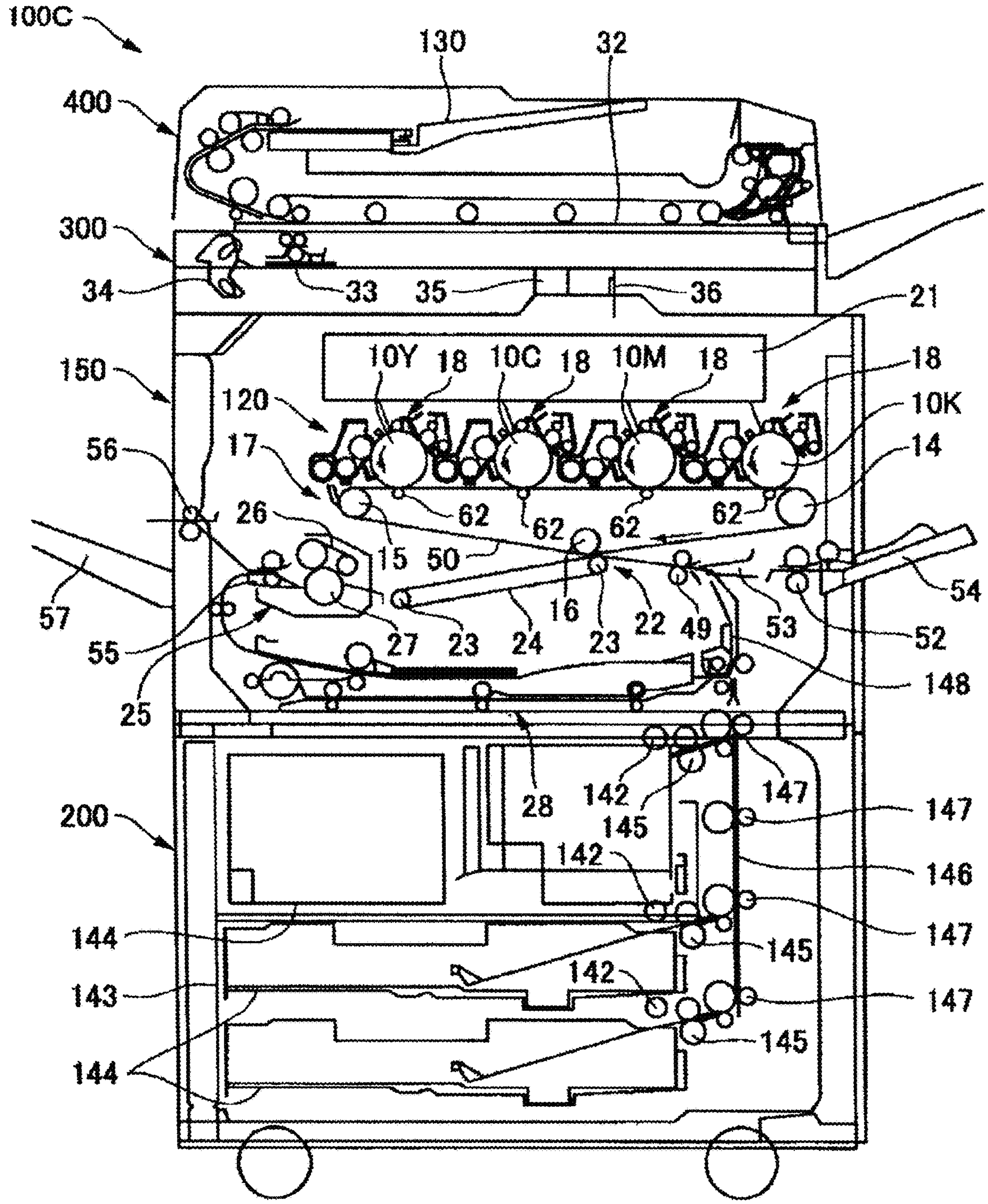
FIG. 4 is a schematic view illustrating another example of an image forming apparatus according to the present disclosure.

FIG. 4 depicts a third example of the image forming apparatus used in the present disclosure. An image forming apparatus 100C is a tandem-type color image forming apparatus, and includes a copying apparatus main body 150, a paper feeding table 200, a scanner 300, and an automatic document feeder (ADF) 400.

An intermediate transfer belt 50 provided at the central part of the copying apparatus main body 150 is an endless belt stretched by three rollers 14, 15, and 16, and can move in a direction indicated by an arrow in the figure. In the vicinity of the roller 15, a cleaning device 17 including a cleaning blade is disposed. The cleaning device 17 is configured to remove the toner remaining on the intermediate transfer belt 50 after the toner image has been transferred onto the recording paper. Image forming units 120 for yellow, cyan, magenta, and black are arranged side by side along the conveyance direction so as to face the intermediate transfer belt 50 stretched by the rollers 14 and 15.

An exposure device 21 is disposed in the vicinity of an image forming unit 120. Further, a secondary transfer belt 24 is disposed on the side of the intermediate transfer belt 50 opposite to the side of the intermediate transfer belt 50 on which the image forming units 120 are disposed. The secondary transfer belt 24 is an endless belt stretched by a pair of rollers 23, and recording paper conveyed on the secondary transfer belt 24 and the intermediate transfer belt 50 can be brought into contact with each other between the rollers 16 and 23.

In the vicinity of the secondary transfer belt 24, a fixing device 25 is disposed. The fixing device 25 includes a fixing belt 26, which is an endless belt stretched by a pair of rollers, and a pressure roller 27 disposed to be pressed against the fixing belt 26. In the vicinity of the secondary transfer belt 24 and the fixing device 25, a sheet reversing device 28 configured to reverse the recording paper when images are formed on both sides of the recording paper is disposed.

Next, a method of forming a full-color image using the image forming apparatus 100C will be described. First, a color document is set on a document table 130 of the automatic document feeder (ADF) 400. Alternatively, the automatic document feeder 400 is opened, a color document is set on a contact glass 32 of the scanner 300, and the automatic document feeder 400 is closed.

In the case where a document is set on the automatic document feeder 400, when a start switch is pressed, the document is conveyed and moved onto the contact glass 32. Then, the scanner 300 is driven, and a first traveling body 33 provided with a light source and a second traveling body 34 provided with a mirror travel. In the case where a document is set on the contact glass 32, the scanner is driven right away, the first traveling body 33 and the second traveling body 34 travel. At this time, light, which is emitted from the first traveling body 33 and is reflected by the document surface, is reflected by the second traveling body 34, and then received by a reading sensor 36 via an imaging forming lens 35.

Figure 5:
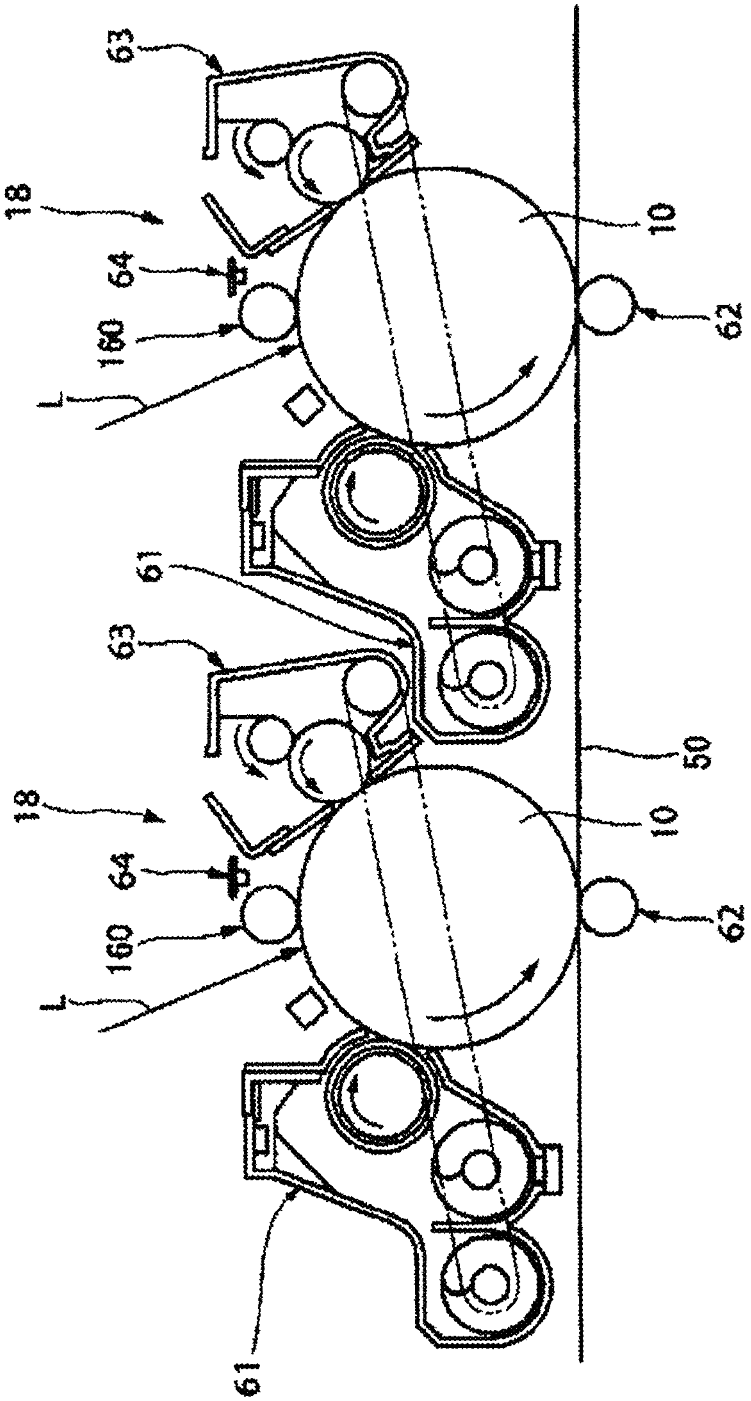
FIG. 5 is a schematic view illustrating another example of an image forming apparatus according to the present disclosure.

Then, the document is read, and image information of black, yellow, magenta, and cyan is obtained. The image information of each color is transmitted to the image forming unit 120 of each color, and a toner image is formed by a developing unit 18 of each color. As depicted in FIG. 5, the developing unit 18 of each color includes: a photoconductor drum 10; a charging roller 160 configured to uniformly charge the photoconductor drum 10; an exposure device configured to expose the photoconductor drum 10 to exposure light L based on image information of each color to form an electrostatic latent image of each color; a developing device 61 configured to develop the electrostatic latent image with a developer of each color to form a toner image of each color; a transfer roller 62 configured to transfer the toner image onto the intermediate transfer belt 50; a cleaning device 63 including a cleaning blade; and a charge-eliminating lamp 64.

The toner images of the respective colors formed by the image forming units 120 of the respective colors are sequentially transferred (primarily transferred) onto the intermediate transfer belt 50, which is stretched by rollers 14, 15, and 16 and is moved, and are superimposed to form a composite toner image.

On the other hand, in the paper feeding table 200, one of paper feed rollers 142 is selectively rotated, recording paper is fed out from one of paper feed cassettes 144 provided in multiple stages in a paper bank 143. Then, sheets of recording paper are separated one by one by a separation roller 145. The recording paper is sent to a paper feed path 146, conveyed by a conveyance roller 147, and guided to a paper feed path 148 in a copying apparatus main body 150. Then, the recording paper is allowed to abut against a registration roller 49 to be stopped.

Alternatively, the sheets of recording paper on a manual feed tray 54 are fed out by rotating a paper feed roller, and are separated one by one by a separation roller 52. Then, the recording paper is guided to a manual feed path 53, and is allowed to abut against the registration roller 49 to be stopped. The registration roller 49 is generally used in a grounded state, but may be used with a bias being applied thereto in order to remove paper dust from the recording paper.

Next, when the registration roller 49 is rotated in synchronization with the composite toner image formed on the intermediate transfer belt 50, the recording paper is fed between the intermediate transfer belt 50 and the secondary transfer belt 24, and the composite toner image is transferred (secondarily transferred) onto the recording paper. The toner remaining on the intermediate transfer belt 50 onto which the composite toner image has been transferred is removed by the cleaning device 17.

The recording paper onto which the composite toner image has been transferred is conveyed by the secondary transfer belt 24, and then the composite toner image is fixed by the fixing device 25. Next, the conveyance path of the recording paper is switched by a switching claw 55, and the recording paper is ejected onto a paper ejection tray 57 by an ejection roller 56. Alternatively, the conveyance path of the recording paper is switched by the switching claw 55, and the recording paper is reversed by the sheet reversing device 28. An image is formed on the back surface in the same manner, and then the recording paper is ejected onto the paper ejection tray 57 by the ejection roller 56.

EXAMPLE

Hereinafter, the present disclosure will be described more specifically with reference to examples, but the present disclosure is not limited to these examples. In the following description, "part(s)" means part(s) by mass unless otherwise specified.

Example 1

<Production of Toner Base Particles A>

-Synthesis of Crystalline Polyester-

First, 1,6-alkanediol (2,300 g), fumaric acid (2,530 g), trimellitic anhydride (291 g), and hydroquinone (4.9 g) were charged into a 5L four-neck flask equipped with a nitrogen-introducing tube, a dehydrating tube, a stirrer, and a thermocouple, and were allowed to react at 160° C. for 5 hours. The mixture was heated to 200° C., was allowed to react for an hour, and was allowed to react at 8.3 kPa for an hour, to obtain [crystalline polyester 1].

-Synthesis of Non-Crystalline Polyester (Low-Molecular Polyester)-

Bisphenol A ethylene oxide 2 mol adduct (229 parts), bisphenol A propylene oxide 3 mol adduct (529 parts), terephthalic acid (208 parts), adipic acid (46 parts), and dibutyltin oxide (2 parts) were charged into a 5L four-neck flask equipped with a nitrogen-introducing tube, a dehydrating tube, a stirrer, and a thermocouple, and were allowed to react at 230° C. under normal pressure for 7 hours. After the mixture was further allowed to react under reduced pressures of from 10 mm Hg to 15 mm Hg for 4 hours, trimellitic anhydride (44 parts) was charged into the reaction container, and the mixture was allowed to react at 180° C. under normal pressure for 2 hours, to obtain [non-crystalline polyester 1]. Here, the [non-crystalline polyester 1] corresponds to an unmodified polyester.

-Synthesis of Polyester Prepolymer-

Bisphenol A ethylene oxide 2 mol adduct (682 parts), bisphenol A propylene oxide 2 mol adduct (81 parts), terephthalic acid (283 parts), trimellitic anhydride (22 parts), and dibutyltin oxide (2 parts) were charged into a reaction container equipped with a cooling tube, a stirrer, and a nitrogen introducing tube. Then, the mixture was allowed to react at 230° C. under normal pressure for 8 hours, and was further allowed to react under reduced pressures of from 10 mm Hg to 15 mm Hg for 5 hours, to obtain [intermediate polyester 1]. The [intermediate polyester 1] was found to have a number average molecular weight (Mn) of 2,100, a weight average molecular weight (Mw) of 9,500, a glass transition temperature (Tg) of 55° C., an acid value of 0.5

KOH mg/g, and a hydroxyl value of 51 KOH mg/g. Here, the [intermediate polyester 1] corresponds to an unmodified polyester.

The [intermediate polyester 1] (410 parts), isophorone diisocyanate (89 parts), and ethyl acetate (500 parts) were charged into a reaction container equipped with a cooling tube, a stirrer, and a nitrogen-introducing tube, and were allowed to react at 100° C. for 5 hours, to obtain [prepolymer 1]. Here, the [prepolymer 1] is a modified polyester, and corresponds to "active hydrogen group-containing compound".

-Synthesis of Ketimine-

Isophoronediamine (170 parts) and methyl ethyl ketone (75 parts) were charged into a reaction container equipped with a stirring rod and a thermometer, and were allowed to react at 50° C. for 5 hours, to obtain [ketimine compound 1]. The amine value of the [ketimine compound 1] was 418. Here, the [ketimine compound 1] corresponds to "polymer capable of reacting with active hydrogen group-containing compound".

-Synthesis of Masterbatch (MB)-

Water (1, 200 parts), carbon black (Printex 35, manufactured by Degussa) [DBP oil absorption amount=42 ml/100 mg, pH=9.5] (540 parts), and the [non-crystalline polyester 1] (1, 200 parts) were added and mixed using a Henschel mixer (manufactured by MITSUI MINING & SMELTING CO., LTD.). The mixture was kneaded at 150° C. for 30 minutes using a two-roll mill, was rolled and cooled, and was pulverized using a pulverizer, to obtain [masterbatch 1].

-Preparation of Pigment/WAX Dispersion Liquid-

The [non-crystalline polyester 1] (378 parts), carnauba WAX (110 parts), and ethyl acetate (947 parts) were charged into a container equipped with a stirring rod and a thermometer. The mixture was heated to 80° C. under stirring, was maintained at 80° C. for 5 hours, and was cooled to 30° C. for an hour. Then, the [masterbatch 1] (500 parts) and ethyl acetate (500 parts) were charged into the container, and were mixed for an hour, to obtain [raw material dissolving solution 1].

The [raw material dissolving solution 1] (1, 324 parts) was transferred into a container, and carbon black and the wax were dispersed using a bead mill (ULTRAVISCO MILL, manufactured by AIMEX CO., LTD.) under the following conditions: a liquid feed rate of 1 kg/hr, a disk peripheral speed of 6 m/sec, 0.5 mm zirconia beads filled to 80% by volume, and 12 passes. Then, a 65% ethyl acetate solution of the [non-crystalline polyester 1] (1042.3 parts) was added thereto, and the mixture was subjected to one-pass using the bead mill satisfying the above conditions, to obtain [pigment/WAX dispersion liquid 1]. The solid content concentration (130° C., 30 minutes) of the [pigment/WAX] was 50%.

-Preparation of Crystalline Polyester Dispersion Liquid-

The [crystalline polyester 1] (100 g) and ethyl acetate (400 g) were charged into a 2 L metallic container, and were heated at 75° C. to be dissolved. Then, the mixture was rapidly cooled in an ice water bath at a rate of 27° C./min. Glass beads (3 mm ϕ) (500 ml) were added thereto, and the mixture was pulverized with a batch-type sand mill apparatus (manufactured by Kanpe Hapio Co., Ltd) for 10 hours to obtain [crystalline polyester dispersion liquid 1].

-Synthesis of Organic Fine Particle Emulsion-

Water (683 parts), a sodium salt of methacrylic acid ethylene oxide adduct sulfate ester (ELEMINOL RS-30: manufactured by Sanyo Chemical Industries, Ltd.) (11 parts), styrene (138 parts), methacrylic acid (138 parts), and ammonium persulfate (1 part) were charged into a reaction container equipped with a stirring rod and a thermometer, and were stirred at 400 rpm for 15 minutes, to obtain a white emulsion. The mixture was heated so that the system temperature reached 75° C., and was allowed to react for 5 hours. Moreover, a 1% ammonium persulfate aqueous solution (30 parts) was added thereto, and was aged at 75° C. for 5 hours, to obtain an aqueous dispersion liquid of a vinyl-based resin (a copolymer of styrene-methacrylic acid-sodium salt of methacrylic acid ethylene oxide adduct sulfate ester), [fine particle dispersion liquid 1]. The volume average particle diameter of the [fine particle dispersion liquid 1] measured using LA-920 was 0.14 μm. A part of the [fine particle dispersion liquid 1] was dried to isolate a resin component.

-Preparation of Aqueous Phase-

Water (990 parts), the [fine particle dispersion liquid 1] (83 parts), a 48.5% aqueous solution of sodium dodecyldiphenyl ether disulfonate (ELEMINOL MON-7: manufactured by Sanyo Chemical Industries, Ltd.) (37 parts), and ethyl acetate (90 parts) were mixed and stirred, to obtain a milky white liquid. This was referred to as [aqueous phase 1].

-Preparation of Oil Phase, Emulsification, and Removal of Solvent-

The [pigment/WAX dispersion liquid] (664 parts), the [prepolymer 1] (109.4 parts), the [crystalline polyester dispersion liquid 1] (120 parts), and the [ketimine compound 1] (4.6 parts) were charged into a container, and were mixed using a TK homomixer (manufactured by Tokushu Kika Kogyo Co., Ltd.) at 5,000 rpm for a minute, to obtain [oil phase 1]. The [aqueous phase 1] (1, 200 parts) was added to the container containing the [oil phase 1], and was mixed using a TK homomixer at 8,000 rpm for 60 seconds, to obtain [emulsified slurry 1]. The [emulsified slurry 1] was charged into a container equipped with a stirrer and a thermometer. After the solvent was removed at 30° C. for 8 hours, the obtained mixture was aged at 45° C. for 4 hours, to obtain [dispersion slurry 1].

-Washing, Heating, and Drying-

After the [dispersion slurry 1] (100 parts) was filtered under reduced pressure, the following procedure was performed.

(1): Ion exchanged water (100 parts) was added to a filtration cake, and was mixed using a TK homomixer (at 12,000 rpm for 10 minutes), followed by filtration.

(2): A 10% sodium hydroxide aqueous solution (100 parts) was added to the filtration cake of (1), and was mixed using a TK homomixer (at 12,000 rpm for 30 minutes), followed by filtration under reduced pressure.

(3): To the filtration cake of (2), 10% hydrochloric acid (100 parts) was added and mixed using a TK homomixer (at 12,000 rpm for 10 minutes), followed by filtration.

(4): To the filtration cake of (3), ion exchanged water (300 parts) was added and mixed using a TK homomixer (at 12,000 rpm for 10 minutes).

(5): The slurry of (4) was heated until the liquid temperature reached 48° C. while mixed using a TK homomixer (at 1,000 rpm), and the liquid temperature of 48° C. was maintained for 30 minutes. As described above, the heat treatment was performed.

(6): The slurry of (5) was cooled to 25° C.

(7): The slurry of (6) was filtered, to obtain [filtration cake 1].

(8): The [filtration cake 1] of (7) was dried at 35° C. for 48 hours using an air-circulating dryer, and was sieved using a mesh having an opening of 75 μm, to obtain [toner base particles A].

<<External Addition Treatment>>

To the [toner base particles A] (100 parts by mass), H1303VP (average primary particle diameter: 23 nm, manufactured by Clariant) (0.6 parts by mass) as silica particles and titanium oxide having an average particle diameter of 20 nm (JMT-150IB, TAYCA CORPORATION) (1.0 part by mass) were added and mixed using a Henschel mixer.

Regarding the mixing order, only the silica particles were added and mixed in the first stage, and then titanium oxide was added thereto and mixed in the second stage. After the mixing, the mixture was passed through a sieve having an opening of 500 mesh, to obtain [toner 1].

<Measurement>

When the glass transition temperature Tg1 of the [toner 1] before the following storage treatment was determined through DSC measurement ("Q-200", manufactured by TA instruments), the glass transition temperature Tg1 was 47° C. The glass transition temperature Tg2 of the [toner 1] after the following storage treatment was 55.5° C.

Storage treatment: When the glass transition temperature of the [toner 1] before the storage treatment is defined as Tg [° C.] and Tg−5° C. is defined as Ta [° C.], the [toner 1] is stored at Ta [° C.] and humidity of 50% RH for 24 hours.

Here, since the glass transition temperature Tg [° C.] of the [toner 1] before the storage treatment corresponds to Tg1, the [toner 1] was subjected to the storage treatment at 42° C. Details of the target sample and the like are as described above.

Moreover, when the [toner 1] was measured through DSC as presented in FIG. 1, the endothermic amount H1 of the [toner 1] before the storage treatment was 9.7 J/g, and the endothermic amount H2 of the [toner 1] after the storage treatment was 7.2 J/g. Therefore, H1−H2 was 2.5 J/g.

Example 2

The [toner 2] was obtained in the same manner as in Example 1 except that the temperature of the heating treatment was changed to 42° C. in the washing, heating, and drying step of Example 1.

Example 3

The [toner 3] was obtained in the same manner as in Example 1 except that the temperature of the heating treatment was changed to 50° C. in the washing, heating, and drying step of Example 1.

Example 4

The [toner 4] was obtained in the same manner as in Example 1 except that the temperature of the heating treatment was changed to 40° C. in the washing, heating, and drying step of Example 1.

Example 5

<Production of Toner>

<<Production of Toner Base Particles B>>

-Production of Pigment Dispersing Element-

The following components were mixed and dissolved, and were dispersed by a homogenizer (IKA ULTRA-TURRAX) and through ultrasonic irradiation, to obtain [blue pigment dispersion liquid 1] having a median particle diameter of 150 nm.

Cyan pigment C.I. Pigment Blue 15:3 (copper phthalocyanine, manufactured by DIC) 50 g Anionic surfactant NEOGEN SC 5 g Ion exchanged water 145 g -Production of Wax Dispersing Element- After the following components were mixed and heated to 97° C., the components were dispersed using ULTRA-TURRAX T50 (manufactured by IKA). Thereafter, the mixture was dispersed using Gaulin homogenizer (manufactured by MEIWA INDUSTRY CO., LTD.) and was treated 20 times under the conditions of 105° C. and 550 kg/cm$^2$, to obtain [WAX dispersing element 1] having a median diameter of 190 nm.

Paraffin wax (manufactured by NIPPON SEIRO CO., LTD., HNP-09) 100 g

Anionic surfactant NEOGEN SC 5 g

Ion exchanged water 295 g

-Production of Non-Crystalline Polyester Resin Latex-

In a 1 L flask, dimethyl terephthalate (170 g), sodium dimethyl isophthalate-5-sulfonate (40.1 g), propylene glycol (106.5 g), dipropylene glycol (53.6 g), diethylene glycol (21.2 g), and dibutyltin oxide (0.07 g) were allowed to react at 170° C. for 5 hours under a nitrogen atmosphere, and were then condensed at 220° C. under reduced pressure. Partway through the reaction, a polymer was sampled, and the reaction was stopped when the molecular weight measured through GPC reached Mw=7,000 and Mn=4,000, to obtain [non-crystalline polyester 2].

After the obtained [non-crystalline polyester 2] (40 g) was added to ion exchanged water (119.2 g) and the mixture was heated to 90° C., the pH was adjusted to 7 using a 5% ammonia solution. This was stirred at 8,000 rpm using ULTRA-TURRAX T50 (manufactured by IKA) while a 10% dodecylbenzene sulfonic acid aqueous solution (0.8 g) was added thereto. In this manner, [non-crystalline polyester resin latex A] having a median diameter of 260 nm was prepared.

-Production of Crystalline Polyester Resin Latex-

In a 5 L flask, sebacic acid (1,982 g), ethylene glycol (1,490 g), sodium dimethyl isophthalate-5-sulfonate (59.2 g), and dibutyltin oxide (0.8 g) were allowed to react at 170° C. for 5 hours under a nitrogen atmosphere, and were then condensed at 220° C. under reduced pressure. Partway through the reaction, a polymer was sampled, and the reaction was stopped when the molecular weight measured through GPC reached Mw=9, 600 and Mn=4, 400, to obtain [crystalline polyester 2]. The melting point (peak top of DSC) was 71° C.

After the obtained [crystalline polyester 2] (40 g) was added to ion exchanged water (119.2 g) and the mixture was heated to 90° C., the pH was adjusted to 7 using a 5% ammonia solution. This was stirred at 8,000 rpm using ULTRA-TURRAX T50 (manufactured by IKA) while a 10% dodecylbenzene sulfonic acid aqueous solution (0.8 g) was added thereto. In this manner, [crystalline polyester resin latex A] having a median diameter of 300 nm was prepared.

-Aggregation Step-

The [blue pigment dispersion liquid 1] (5 parts), the [WAX dispersing element 1] (5 parts), the [non-crystalline polyester resin latex A] (90 parts), and the [crystalline polyester resin latex A] (10 parts) were sufficiently mixed and dispersed in a round stainless flask using a homogenizer (manufactured by IKA, ULTRA-TURRAX T50). Then, the flask was heated to 48° C. while being stirred in a heating oil bath to aggregate the particles. When it was confirmed that the particle diameter reached 5.7 μm, the pH in the system was adjusted to 6.0 with a 0.5 mol/l sodium hydroxide aqueous solution, and the mixture was heated to 60° C. while being continuously stirred. The mixture was cooled to obtain [dispersion slurry 2].

-Washing, Heating, Filtration, and External Addition Treatment-

The [dispersion slurry 2] was treated in the same manner as in Example 1 to obtain [toner 5].

Comparative Example 1

The [toner 6] was obtained in the same manner as in Example 1 except that the heating treatment was not performed in the washing, heating, and drying step of Example 1.

Comparative Example 2

The [toner 7] was obtained in the same manner as in Example 1 except that the temperature of the heating treatment was changed to 54° C. in the washing, heating, and drying step of Example 1.

Comparative Example 3

The [toner 8] was obtained in the same manner as in Example 1 except that the temperature of the heating treatment was changed to 58° C. in the washing, heating, and drying step of Example 1.

Comparative Example 4

The [toner 9] was obtained in the same manner as in Example 5 except that the heating treatment was not performed in the washing, heating, and drying step of Example 5 of Example 5.

(Evaluation)

The [toner 1] to the [toner 9] were subjected to the following evaluations (evaluation of low-temperature fixability, offset resistance, heat-resistant storage stability, and filming) and were comprehensively evaluated. The results are summarized in Table 1.

<Low-Temperature Fixability and Offset Resistance>

A copying test was performed on Type 6200 paper (manufactured by Ricoh Co., Ltd.) using an apparatus obtained by modifying a fixing part of a copying apparatus MF2200 (manufactured by Ricoh Co., Ltd.) with Teflon (Registered Trademark) roller as a fixing roller. Specifically, a cold offset temperature (fixing lower limit temperature) and a high temperature offset (fixing upper limit temperature) were determined by changing the fixing temperature. The evaluation conditions of the fixing lower limit temperature were as follows: the linear speed of paper feeding of from 120 mm/sec to 150 mm/sec, the surface pressure of 1.2 kgf/cm$^2$, and the nip width of 3 mm. Note that, the fixing lower limit temperature of a traditional low temperature fixing toner is about 130° C. Evaluation criteria were as follows. In the evaluation criteria, "A", "B", and "C" were determined to be acceptable, and "D" was determined to be unacceptable.

[Evaluation Criteria of Low-Temperature Fixability)

A: The fixing lower limit temperature was less than 120° C.

B: The fixing lower limit temperature was 120° C. or more and less than 125° C.

C: The fixing lower limit temperature was 125° C. or more and less than 130° C.

D: The fixing lower limit temperature was 130° C. or more.

[Evaluation Criteria of Offset Resistance]

A: The fixing upper limit temperature was 190° C. or more.

B: The fixing upper limit temperature was 180° C. or more and less than 190° C.

C: The fixing upper limit temperature was 170° C. or more and less than 180° C.

D: The fixing upper limit temperature was less than 170° C.

<Heat-Resistant Storage Stability>

After the toner was stored at 50° C. for 8 hours, it was sieved with a 42-mesh sieve for 2 minutes, and the residual ratio on the mesh was measured. At this time, the better the heat-resistant storage stability of the toner, the smaller the residual ratio. The evaluation criteria of the heat-resistant storage stability were as follows.

[Evaluation Criteria]

A: The residual rate was less than 10%.

B: The residual rate was 10% or more and less than 20%.

C: The residual rate was 20% or more and less than 30%.

D: The residual rate was 30% or more.

<Evaluation of Filming>

For a long-term image evaluation, a photoconductor by which image-forming on 30,000 sheets was performed was visually inspected, and whether or not toner components, mainly the release agent adhered to the photoconductor was evaluated based on the following evaluation criteria. The toner used for the evaluation of filming was a toner before undergoing the storage treatment. The apparatus illustrated in FIG. 4 was used for image formation, and one image forming unit was used. The developer used for the evaluation of filming was prepared as follows.

<<Preparation of Carrier>>

A homomixer was used to disperse organo straight silicone (100 parts), γ-(2-aminoethyl)aminopropyltrimethoxysilane (5 parts), carbon black (10 parts), and toluene (100 parts) for 20 minutes, to obtain a coating liquid for coating layer. A fluidized bed-type coating apparatus was used to coat the coating liquid for coating layer on the surface of spherical magnetite having an average particle diameter of 50 μm (1,000 parts), to obtain a carrier.

<<Preparation of Developer>>

A ball mill was used to mix the toner (5 parts) and the carrier (95 parts), to obtain a developer.

The evaluation criteria of the image evaluation were as follows.

[Evaluation Criteria]

A: Adherence of the toner components to the photoconductor was not observed.

B: Adherence of the toner components to the photoconductor was very small, and was not at a problematic level in practical use.

C: Adherence of the toner components to the photoconductor was observed, but was not at a problematic level in practical use.

D: Much adherence of the toner components to the photoconductor was observed, and was at a problematic level in practical use.

<Overall Evaluation>

The criteria for overall judgement were as follows. In the evaluation criteria, A, B, and C were determined to be acceptable, and D was determined to be unacceptable.

[Evaluation Criteria]

A: There was neither "D" nor "c" in the above four items, and were two or more "A" in the above four items.

B: There was neither "D" not "C" in the above four items.

C: There was no "D", and was at least one "C" in the above four items.

D: There was at least one "D" in the above evaluated four items.

| | | Heat treatment temperature [° C.] | H1-H2 [J/g] | Tg2-Tg1 [° C.] | Fixing temperature | Storage ability | Offset resistance | Filming evaluation | Overall judgement |
|---|---|---|---|---|---|---|---|---|---|
| Ex. 1 | Toner 1 | 48 | 2.5 | 8.5 | A | B | B | B | B |
| Ex. 2 | Toner 2 | 42 | 1.8 | 5.0 | B | A | A | B | A |
| Ex. 3 | Toner 3 | 50 | 4.5 | 9.5 | A | A | A | A | A |
| Ex. 4 | Toner 4 | 40 | 1.5 | 4.5 | C | A | B | B | C |
| Ex. 5 | Toner 5 | 48 | 2.7 | 6.0 | A | A | A | B | A |
| Comp. Ex. 1 | Toner 6 | No heat treatment | 1.2 | 1.5 | D | A | B | A | D |
| Comp. Ex. 2 | Toner 7 | 53 | 4.8 | 9.8 | A | D | A | C | D |
| Comp. Ex. 3 | Toner 8 | 58 | 0.9 | 2.0 | A | D | D | D | D |
| Comp. Ex. 4 | Toner 9 | No heat treatment | 1.0 | 1.0 | D | A | C | A | D |

As described above, the toner of the present disclosure satisfying the predetermined requirements with respect to H1-H2 and Tg2-Tg1 passed the evaluations of the low-temperature fixability, the storage stability, the offset resistance, and the filming.

In particular, the toners of Examples 1 to 3 and 5 achieved good results: A or B in the evaluations of the low-temperature fixability, the storage stability, the offset resistance, and the filming. In Example 4, partial miscibility between the crystalline polyester and the amorphous polyester was insufficient, and the low-temperature fixability was slightly inferior.

On the other hand, in Comparative Examples 1 and 4, since the crystalline polyester and the amorphous polyester were not miscible with each other, the low-temperature fixability was evaluated as "D".

In Comparative Example 2, since partial miscibility between the crystalline polyester and the amorphous polyester was excessive, the storage stability was evaluated as "D".

In Comparative Example 3, since the crystalline polyester and the amorphous polyester were completely miscible with each other, recrystallization of the crystalline polyester due to storage did not occur, and the storage stability and the filming property were evaluated as "D".

According to the present disclosure, the toner of the present disclosure has excellent low-temperature fixability and storage ability and good offset resistance, and can form an image with high quality and good sharpness over a long period of time.

Further, the present invention is not limited to these embodiments, but various variations and modifications may be made without departing from the scope of the present invention.

What is claimed is:

1. A toner producing method comprising:

dispersing, in an aqueous medium, an oil phase including a release agent and either or both of a binder resin and a binder resin precursor; and washing a slurry obtained by the dispersing and subjecting the slurry to a heat treatment to obtain toner, wherein:

the binder resin includes a crystalline polyester and an amorphous polyester, the heat treatment is performed at 40° C. or more and 50° C. or less, and the toner comprises:

the binder resin; and the release agent, in a measurement result of a first temperature rise obtained by measurement through differential scanning calorimetry (DSC) of the toner before undergoing a storage treatment below, one or more peaks as an endothermic component are present in a temperature region lower than a peak derived from the crystalline polyester; and the toner satisfies expression (1) below;

where a glass transition temperature of the toner is defined as Tg [C] and Tg−5° C. is defined as Ta [° C.], the toner is stored at Ta [° C.] and humidity of 50% RH for 24 hours, provided that the glass transition temperature Tg of the toner corresponds to a glass transition temperature of the toner before undergoing the storage treatment, $$1.5<H1-H2<4.5[\text{J/g}] \quad \text{expression (1)},$$

where, in the expression (1), H1 is a total endothermic amount of an endothermic amount of the peak derived from the crystalline polyester and an endothermic amount of the one or more peaks present in the temperature region lower than the peak derived from the crystalline polyester in the measurement result of the first temperature rise obtained by measurement through DSC of the toner before undergoing the storage treatment, and H2 is a total endothermic amount of an endothermic amount of a peak derived from the crystalline polyester and an endothermic amount of a peak present in a temperature region lower than the peak derived from the crystalline polyester in a measurement result of a first temperature rise obtained by measurement through the DSC of the toner after undergoing the storage treatment, provided that when the endothermic amount of the peak present in the temperature region lower than the peak derived from the crystalline polyester is zero, the H2 is the endothermic amount of the peak derived from the crystalline polyester.

2. The toner producing method according to claim 1, wherein:

the toner satisfies expression (2) below:

$$2.5\leq H1-H2\leq 4.5[\text{J/g}] \quad \text{expression (2)}.$$

3. The toner producing method according to claim 1, wherein:

the toner satisfies the following expression:

$$5.0\leq Tg2-Tg1\leq 10.0[°\text{ C.}],$$

where Tg1 is a glass transition temperature determined by measuring, through the DSC, the toner before undergoing the storage treatment, and Tg2 is a glass transition temperature determined by measuring, through the DSC, the toner after undergoing the storage treatment.

4. The toner producing method according to claim 1, wherein:

the amorphous polyester includes a urethane bond, a urea bond, or both.

5. The toner producing method according to claim 1, wherein:

the release agent is a wax having a melting point of 50° C. to 120° C.

6. The toner producing method according to claim 5, wherein:

the release agent comprises carnauba wax.

7. The toner producing method according to claim 1, wherein:

the binder resin precursor is a polyester prepolymer comprising an isocyanate group.

8. The toner producing method according to claim 1, wherein:

the dispersing is performed in the aqueous medium which comprises fine resin particles.

9. The toner producing method according to claim 1, further comprising:

removing an organic solvent from a dispersion liquid to form the slurry before the washing.

10. The toner producing method according to claim 9, wherein:

the organic solvent is ethyl acetate.

11. The toner producing method according to claim 1, further comprising:

adding an external additive to the toner after the heat treatment.

12. The toner producing method according to claim 11, wherein:

the external additive comprises silica.

13. The toner producing method according to claim 11, wherein:

the external additive comprises titanium oxide.

14. The toner producing method according to claim 1, wherein:

the crystalline polyester is synthesized from a saturated aliphatic diol and a dicarboxylic acid having a double bond.

15. The toner producing method according to claim 1, wherein:

the amorphous polyester is synthesized from a bisphenol A adduct and terephthalic acid.

16. The toner producing method according to claim 1, wherein:

the toner further comprises carbon black as a colorant.

17. The toner producing method according to claim 1, wherein:

the heat treatment is performed for a duration of 5 minutes to 60 minutes.

18. The toner producing method according to claim 1, wherein:

the heat treatment is performed at a temperature of Tg−5.0° C. to Tg+5.0° C., where Tg is the glass transition temperature of the toner before undergoing the storage treatment.

19. The toner producing method according to claim 1, wherein:

the crystalline polyester is present in an amount of 1 part by mass to 30 parts by mass relative to 100 parts by mass of the toner.

20. The toner producing method according to claim 1, wherein:

the release agent has a melt viscosity of 5 cps to 1,000 cps at a temperature that is 20° C. higher than a melting temperature of the release agent.

* * * * *